US008463056B2

(12) United States Patent
Fukuhara

(10) Patent No.: US 8,463,056 B2
(45) Date of Patent: Jun. 11, 2013

(54) INFORMATION PROCESSING APPARATUS AND INFORMATION PROCESSING METHOD THAT DECODE A PORTION OF A CODE STREAM

(75) Inventor: Takahiro Fukuhara, Kanagawa (JP)

(73) Assignee: Sony Corporation, Tokyo (JP)

( * ) Notice: Subject to any disclaimer, the term of this patent is extended or adjusted under 35 U.S.C. 154(b) by 712 days.

(21) Appl. No.: 12/466,588

(22) Filed: May 15, 2009

(65) Prior Publication Data
US 2009/0304273 A1 Dec. 10, 2009

(30) Foreign Application Priority Data
Jun. 10, 2008 (JP) .................................. 2008-151696

(51) Int. Cl.
G06K 9/36 (2006.01)
G06K 9/46 (2006.01)

(52) U.S. Cl.
USPC .............................. 382/232; 382/233; 382/248

(58) Field of Classification Search
USPC ...................... 382/232–253; 348/394.1–42.1; 375/240.301–240.24; 358/426.01–426.14
See application file for complete search history.

(56) References Cited

U.S. PATENT DOCUMENTS

| 6,539,056 | B1 | 3/2003 | Sato et al. | |
| 6,987,890 | B2 | 1/2006 | Joshi et al. | |
| 7,106,366 | B2 | 9/2006 | Parker et al. | |
| 7,200,277 | B2 | 4/2007 | Joshi et al. | |
| 7,298,910 | B2 | 11/2007 | Fukuhara et al. | |
| 7,440,626 | B2* | 10/2008 | Kong et al. | 382/232 |
| 2003/0063809 | A1* | 4/2003 | Andrew | 382/240 |
| 2003/0110299 | A1* | 6/2003 | Larsson et al. | 709/247 |
| 2003/0113027 | A1* | 6/2003 | Chan et al. | 382/240 |
| 2003/0185453 | A1* | 10/2003 | Joshi et al. | 382/239 |
| 2003/0193578 | A1* | 10/2003 | Parulski et al. | 348/220.1 |
| 2004/0078491 | A1* | 4/2004 | Gormish et al. | 709/247 |
| 2004/0136598 | A1* | 7/2004 | Le Leannec et al. | 382/232 |
| 2004/0141652 | A1* | 7/2004 | Fukuhara et al. | 382/232 |
| 2004/0223650 | A1* | 11/2004 | Guillou et al. | 382/232 |
| 2005/0002573 | A1* | 1/2005 | Joshi et al. | 382/232 |
| 2005/0163223 | A1* | 7/2005 | Klamer et al. | 375/240.25 |
| 2006/0012495 | A1* | 1/2006 | Fukuhara et al. | 341/50 |
| 2007/0206873 | A1* | 9/2007 | Schwenke et al. | 382/239 |

FOREIGN PATENT DOCUMENTS

| JP | 2001-204030 | 7/2001 |
| JP | 2001-223593 | 8/2001 |

(Continued)

OTHER PUBLICATIONS

AP Tzannes "An interative rate control technique for motion JPEG2000", SPIE, v.4790, 2002.*
Taubman, D.;"High performance scalable image compression with EBCOT" IEEE Transactions onImage Processing, 2000, vol. 9, Issue:7, pp. 1158-1170.*
Sikora, T. "Trends and Perspectives in Image and Video Coding", Proceedings of the IEEE, 2005 vol. 93 , Issue: 1, pp. 6-17.*

Primary Examiner — Li Liu
(74) Attorney, Agent, or Firm — Oblon, Spivak, McClelland, Maier & Neustadt, L.L.P.

(57) ABSTRACT

Disclosed herein is an information processing apparatus including: a partial decoder configured to decode a portion of a first code stream representative of coded image data into baseband image data; and an encoder configured to encode the baseband image data from the partial decoder into a second code stream having a format converted from the format of the first code stream, wherein the encoder encodes the baseband image data using a target value for parameters with respect to the second code stream, into the second code stream having the format thereof, and the partial decoder determines the portion to be decoded of the first code stream, using the target value, and decodes the determined portion of the first code stream.

18 Claims, 31 Drawing Sheets

FOREIGN PATENT DOCUMENTS

| | | |
|---|---|---|
| JP | 2002-344996 | 11/2002 |
| JP | 2005-102184 | 4/2005 |
| JP | 2005-223407 | 8/2005 |
| JP | 2007-235934 | 9/2007 |
| JP | 2007-251968 | 9/2007 |
| JP | 4016166 | 9/2007 |

* cited by examiner

CODE BLOCK
(EX. 64×64)

FIG. 21

| BIT RATE FOR PARTIAL DECODING | NUMBER OF CPU CLOCK CYCLES PER INSTRUCTION | PSNR[dB] OF DECODED IMAGE OF LOSSY ENCODED FILE | NUMBER OF CPU CLOCK CYCLES PER INSTRUCTION FOR LOSSY ENCODING (250 Mbps) |
|---|---|---|---|
| LOSSLESS COMPRESSION RATE (3,469 Mbps) | 7,105 | 37.38 | 904 |
| 1,000 Mbps | 2,337 | 37.36 | 904 |
| 500 Mbps | 1,333 | 37.23 | 904 |
| 400 Mbps | 1,104 | 37.14 | 904 |
| 300 Mbps | 880 | 37.05 | 904 |
| 250 Mbps | 771 | 36.89 | 904 |

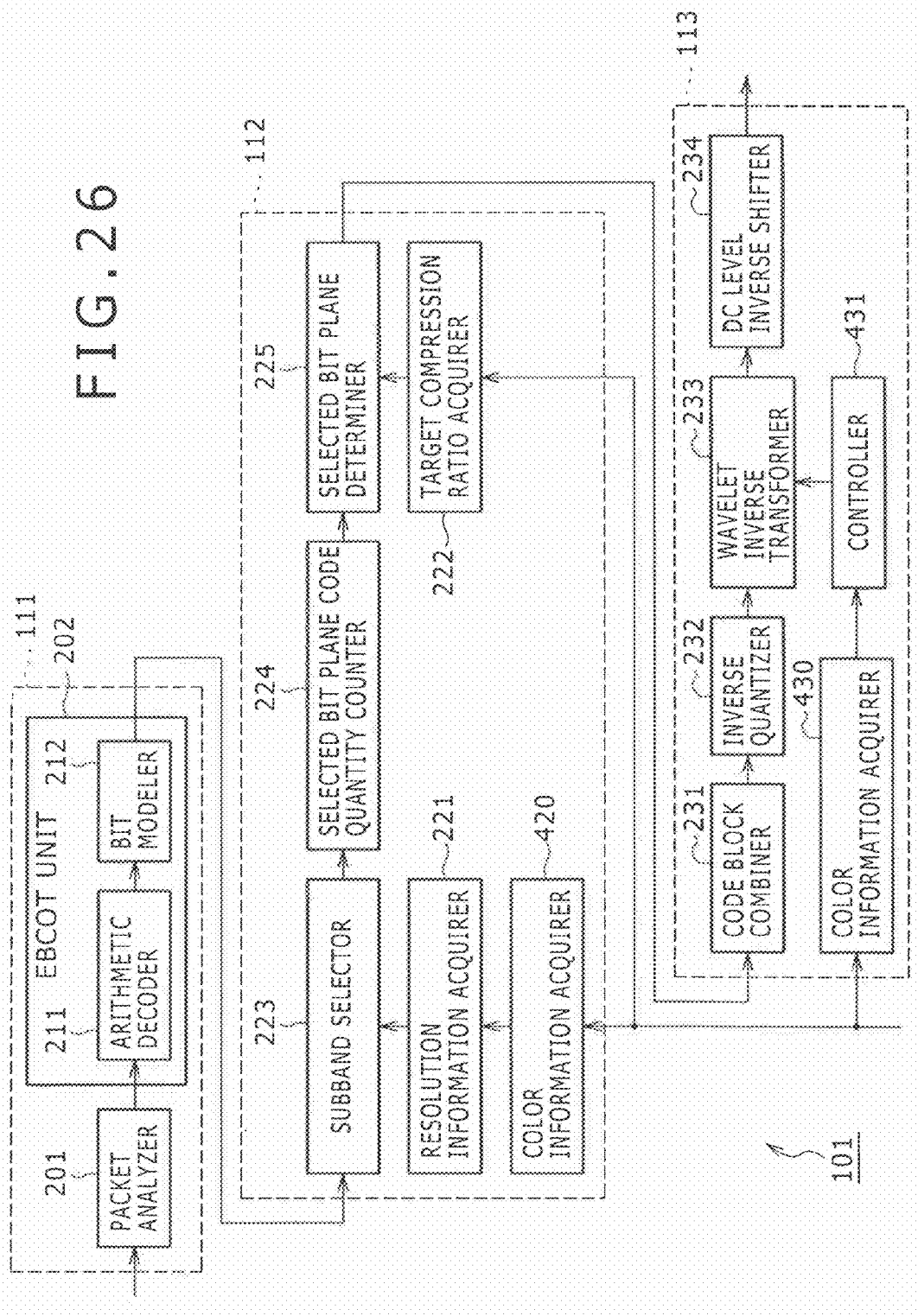

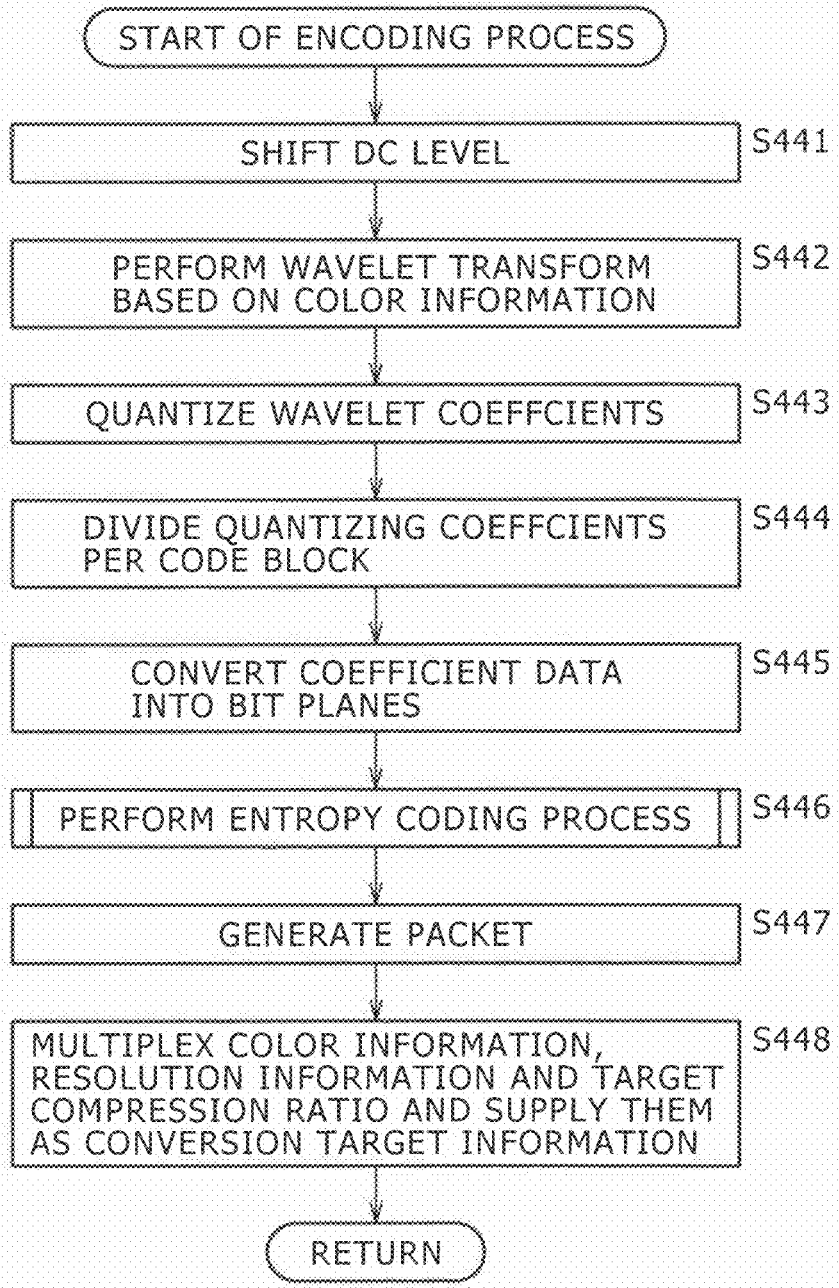

INFORMATION PROCESSING APPARATUS AND INFORMATION PROCESSING METHOD THAT DECODE A PORTION OF A CODE STREAM

BACKGROUND OF THE INVENTION

1. Field of the Invention

The present invention relates to an information processing apparatus and an information processing method, and more particularly to an information processing apparatus and an information processing method for reducing the burden of a transcoding process for converting a format such as the compression ratio of a code stream, the resolution of an image, a color format, or the like.

2. Description of the Related Art

Archive systems or image databases that have heretofore been available store uncompressed images referred to as master images. For retrieving stored uncompressed images as needed, they are compressed into a compressed file that will be distributed through a network or saved in a recording medium.

In filmmaking, images are captured on 35-mm or 60-mm films and then converted into digital image data by an apparatus referred to as a film scan converter. The digital image data serve as master image data.

In the medical field, images captured on films are similarly converted into digital image data as master image data by a film scan converter, though some X-ray photographic image data may be directly used as uncompressed image data.

Many modern single-lens reflex digital cameras allow RAW data or RGB data acquired from a CCD (Charge-Coupled device) or a CMOS (Complementary Metal Oxide Semiconductor) image sensor to be saved as uncompressed image data in a memory card.

Although uncompressed master image data are important and desirable as they are free of lossy data, they tend to be large in data size. For transferring master image data through a network or recording large master image data in a memory card, they need to be compressed or encoded in some way.

For storing master image data in a hard disk, it has been customary to losslessly compress the master image data into a lossless compression file, and store the lossless compression file in the hard disk. In this case, it is convenient to save the master image data in an inexpensive recording medium such as a tape.

In the applications of digital cinema, a format for compressing master image data for distributing movies is determined according to DCI (Digital Cinema Initiatives). According to the DCI specifications, JPEG (Joint Photographic Experts Group) 2000 Part-1 as an ISO (International Organization for Standardization) standard is used as the compression and expansion technology, and the bit rate has a peak rate of 250 Mbps for a moving image sequence of XYZ 12 bits (24 Hz) at an image size of 4,096×2,160 pixels. Master image data need to be encoded at the above bit rate for distribution and projection.

The DCI specifications are addressed to the resolution of 4,096×2,160 pixels which is four times the resolution of HDTV (High Definition Television). According to the DCI specifications, therefore, it is often customary to losslessly compress master image data into a data size which is a fraction of the original data size and store the compressed image data in a storage medium such as a hard disk.

The image data stored in the storage medium are subsequently losslessly expanded into baseband data, which are then irreversibly compressed into a JPEG 2000 file according to the DCI standard by the JPEG 2000 lossy compression technique.

Codec techniques other than JPEG 2000 include MPEG-2 (Moving Picture Experts Group-2) for satellite digital broadcasts and H.264 Video Codec for one-segment broadcasts. Therefore, there are instances where image data compressed by JPEG 2000 need to be converted into formats according to other codec techniques such as MPEG-2 and H.264 Video Codec. While high-resolution image data such as digital cinema data are often processed by JPEG 2000, image data having resolutions lower than the HDTV resolution are mainly processed by MPEG-2 and H.264 Video Codec. Consequently, when image data are transcoded from the JPEG 2000 format into the MPEG-2 or H.264 Video Codec format, the resolution of the image data may also need to be converted at the same time.

For data conversion, there are known down decoders for performing an inverse discrete cosine transform using only coefficients of low-frequency components of DCT blocks of a bit stream of high-resolution image data to decode them into standard-resolution image data. For details, reference should be made to Japanese patent No. 4016166 and Japanese patent No. 4026238, for example.

SUMMARY OF THE INVENTION

According to the converting process which is performed by a transcoder of the related art for converting the format of a code stream, a code stream is entirely decoded into baseband data, the baseband data are converted, and then the converted data are encoded into a code stream. When a large amount of data, e.g., master image data, is processed, the decoding process tends to impose a large burden.

The processes disclosed in Japanese patent No. 4016166 and Japanese patent No. 4026238 employ MPEG-2 as a coding process. Consequently, the processing sequence is complex and imposes a large burden. In addition, the converting process is liable to lower the image quality greatly, and has not been designed in collaboration with the encoding process.

It is desired for the present invention to provide an information processing apparatus and an information processing method for reducing the burden of a transcoding process for converting the format of a code stream into another format and minimizing unwanted image quality reductions.

According to an embodiment of the present invention, there is provided an information processing apparatus including partial decoding means for decoding a portion of a first code stream representative of coded image data into baseband image data, and encoding means for encoding the baseband image data from the partial decoding means into a second code stream having a format converted from the format of the first code stream, wherein the encoding means encodes the baseband image data using a target value for parameters with respect to the second code stream, into the second code stream having the format thereof, and the partial decoding means determines the portion to be decoded of the first code stream using the target value, and decodes the determined portion of the first code stream.

According to another embodiment of the present invention, there is also provided an information processing method to be carried out by an information processing apparatus for converting a format of a first code stream representative of coded image data to generate a second code stream, the information processing apparatus including partial decoding means for decoding a portion of the first code stream, and encoding means for encoding baseband image data generated when the portion of the first code stream is decoded by the partial decoding means, into the second code stream. The information processing method includes the steps of encoding, with the encoding means, the baseband image data using a target value for parameters with respect to the second code stream, into the second code stream having a desired thereof, and determining, with the partial decoding means, the portion to be decoded of the first code stream using the target value, and decoding, with the partial decoding means, the determined portion of the first code stream.

According to the present invention, the portion to be decoded of the first code stream is determined using the target value for the parameters with respect to the second code stream, and the determined portion of the first code stream is decoded. Using the target value, the baseband image data are encoded into the second code stream having the desired format.

The information processing apparatus and the information processing method according to the embodiments of the present invention can convert a code stream having a format into a code stream having another format. The information processing apparatus and the information processing method are capable of reducing the burden of a process for converting a code stream having a format into a code stream having another format, and also of minimizing an unwanted reduction in the image quality of the baseband image data.

The above and other features and advantages of the present invention will become apparent from the following description when taken in conjunction with the accompanying drawings which illustrate preferred embodiments of the present invention by way of example.

BRIEF DESCRIPTION OF THE DRAWINGS

FIG. 21 is a diagram showing the relationship between bit rates and PSNR (Peak Signal-to-Noise Ratio) in the partial decoding process;

FIG. 26 is a block diagram showing still another detailed configurational example of the partial decoder;

FIG. 30 is a flowchart of another example of the encoding process;

DETAILED DESCRIPTION OF THE PREFERRED EMBODIMENTS

Figure 1:
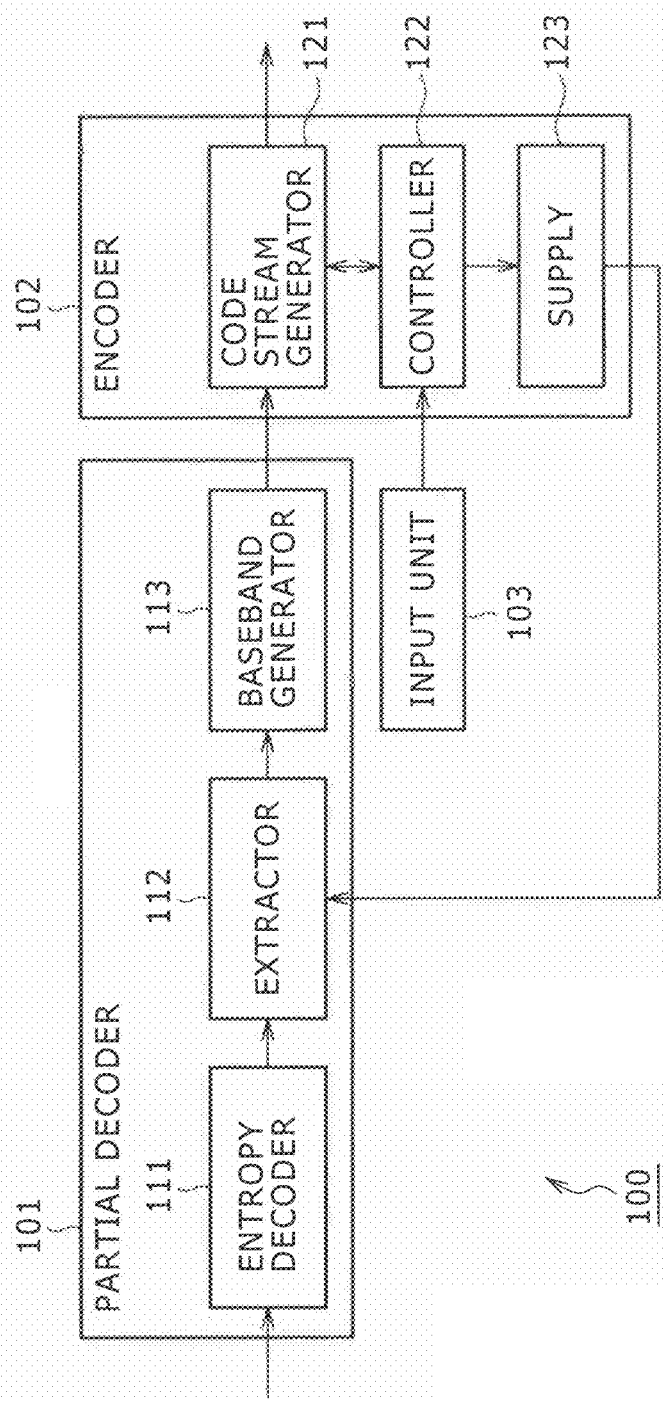
FIG. 1 is a block diagram showing a main configurational example of a transcoder according to an embodiment of the present invention.

FIG. 1 shown in block form is a main configurational example of a transcoder 100 according to an embodiment of the present invention. The transcoder 100 is a format converter for converting a code stream representative of coded image data into a code stream of another format. For example, the transcoder 100 converts a code stream which has been coded according to JPEG (Joint Photographic Experts Group) 2000 into coded data according to H.264 Video Codec.

The transcoder 100 includes a decoder for decoding a code stream into baseband image data and an encoder for coding the baseband image data. The decoder of the transcoder 100 decodes the code stream based on information representative of a compression ratio serving as a target value for coding, an image resolution, etc., thereby reducing any processing on unnecessary data. With the decoder thus operating, the transcoder 100 reduces not only the burden imposed by the decoding process, but also image quality reductions caused by the converting process.

As shown in FIG. 1, the transcoder 100 includes a partial decoder 101, an encoder 102, and an input unit 103.

The partial decoder 101 decodes a portion of a code stream input thereto into baseband image data. The encoder 102 compresses the baseband image data according to a given compression process, and outputs a generated code stream.

The encoder 102 supplies information about the generated code stream, i.e., information about a target compression ratio and a resolution, as transform target information to the partial decoder 101. Based on the supplied transform target information, the partial decoder 101 partially decodes only a necessary portion of the code stream into baseband image data. As a change (a change in a code quantity or a resolution) caused in the data of the code stream by the transcoding process is greater, the portion of the code stream decoded by the partial decoder 101 is smaller, and hence the amount of data processed by the decoding process is smaller, as described later.

If the code quantity of the baseband image data generated by the partial decoder 101 is too small, then the encoder 102 may possibly fail to achieve the target code quantity and resolution. Accordingly, the partial decoder 101 selects and decodes codes in order to generate baseband image data having an information quantity that is required for the encoder 102 to achieve the target value, or an information quantity that is slightly greater than the above information quantity. Stated otherwise, the partial decoder 101 partially decodes the code stream in order to reduce the amount of data processed by the decoding process within a range for the encoder 102 to be able to achieve the target value. The partial decoder 101 determines such a range based on the transform target information that is supplied from the encoder 102. By performing the above partial decoding process, the partial decoder 101 can decode the code stream easily and appropriately even though the master image (original image) data have a large data size.

The process for partially decoding the code stream will be referred to as a partial decoding process. The transcoder 100 may convert the format of a code stream which may be of any of various types. It is assumed hereinafter that the transcoder 100 receives a code stream coded according to JPEG 2000, converts the resolution and bit rate (compression ratio) of image data of the code stream, and outputs a code stream coded according to JPEG 2000. Consequently, the partial decoder 101 and the encoder 102 codes or decodes a code stream according to JPEG 2000. If the transcoder 100 receives a code stream according to a format other than JPEG 2000 or outputs a code stream according to a format other than JPEG 2000, then the partial decoder 101 and the encoder 102 may perform a decoding process and a coding process, respectively, which correspond to the format.

The partial decoder 101 includes an entropy decoder 111, an extractor 112, and a baseband generator 113. The entropy decoder 111 entropy-decodes a code stream input thereto and supplies produced coefficient data to the extractor 112. The extractor 112 extracts necessary coefficient data based on the transform target information supplied from the encoder 102, and supplies the extracted coefficient data to the baseband generator 113. The baseband generator 113 processes the supplied coefficient data by way of wavelet inverse transform or the like to generate baseband image data, and supplies the generated baseband image data to the encoder 102.

The encoder 102 includes a code stream generator 121, a controller 122, and a supply 123. The code stream generator 121 codes the baseband image data supplied from the partial decoder 101 according to JPEG 2000, for example, under the control of the controller 122, to generate a code stream, and outputs the generated code stream. The controller 122 controls the code stream generator 121 with the bit rate (compression rate) and image resolution of the converted code stream based on information supplied from an external device or a user action which is received by the input unit 103. The controller 122 also supplies the information entered from the input unit 103 to the supply 123. The supply 123 supplies the information from the controller 122 as the transform target information to the partial decoder 101.

The extractor 112 extracts only data which are required to be encoded based on the transform target information supplied from the supply 123. Therefore, the baseband generator 113 can reduce any processing of unnecessary data.

Figure 2:
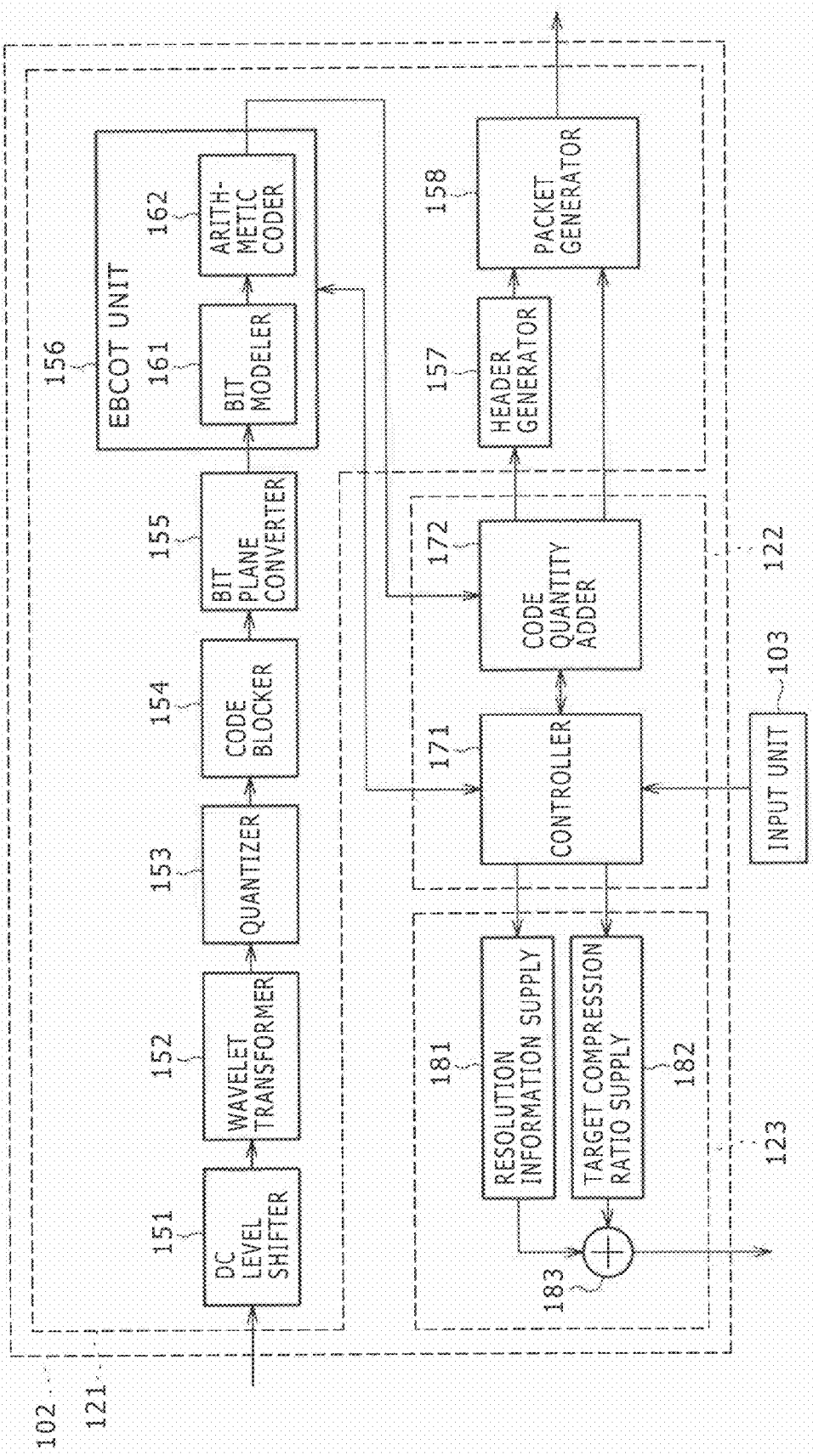
FIG. 2 is a block diagram showing a detailed configurational example of an encoder.

Configurational details of the transcoder 100 shown in FIG. 1 will be described below. First, the encoder 102, and then the partial decoder 101 will be described for convenience of description. FIG. 2 shows in block form a detailed configurational example of the encoder 102. As shown in FIG. 2, the code stream generator 121 of the encoder 102 includes a DC level shifter 151, a wavelet transformer 152, a quantizer 153, a code blocker 154, a bit plane converter 155, an EBCOT (Embedded Coding with Optimized Truncation) unit 156, a header generator 157, and a packet generator 158.

The DC level shifter 151 shifts the level of a DC component of image data for performing efficient wavelet transformation at a subsequent stage. For example, an RGB signal supplied as an original signal to the encoder 102 has a positive value (representing an integer with no sign). Based on the nature of the RGB signal having the positive value, the DC level shifter 151 shifts the DC component of the RGB signal to reduce the dynamic range thereof to one half for improved compression efficiency. If a signal representing an integer with a sign (positive or negative), such as Cb, Cr (color difference signals) of a YCbCr signal, is supplied as an original signal to the encoder 102, then the DC level shifter 151 does not shift the level of the DC component of the original signal.

The wavelet transformer 152 includes a filter bank including a low-pass filter and a high-pass filter. Since digital filters usually have an impulse response (filter coefficient) with a plurality of tap lengths, the wavelet transformer 152 has a buffer for buffering input image data until they can be filtered.

When the wavelet transformer 152 acquires not less than a minimum amount of DC-level-shifted image data which is required for filtering from the DC level shifter 151, the wavelet transformer 152 filters the acquired DC-level-shifted image data using 5×3 wavelet transformation filters, thereby generating wavelet coefficients. The wavelet transformer 152 filters the image data into low-frequency components and high-frequency components in each of vertical and horizontal directions of the image data.

Figure 3:
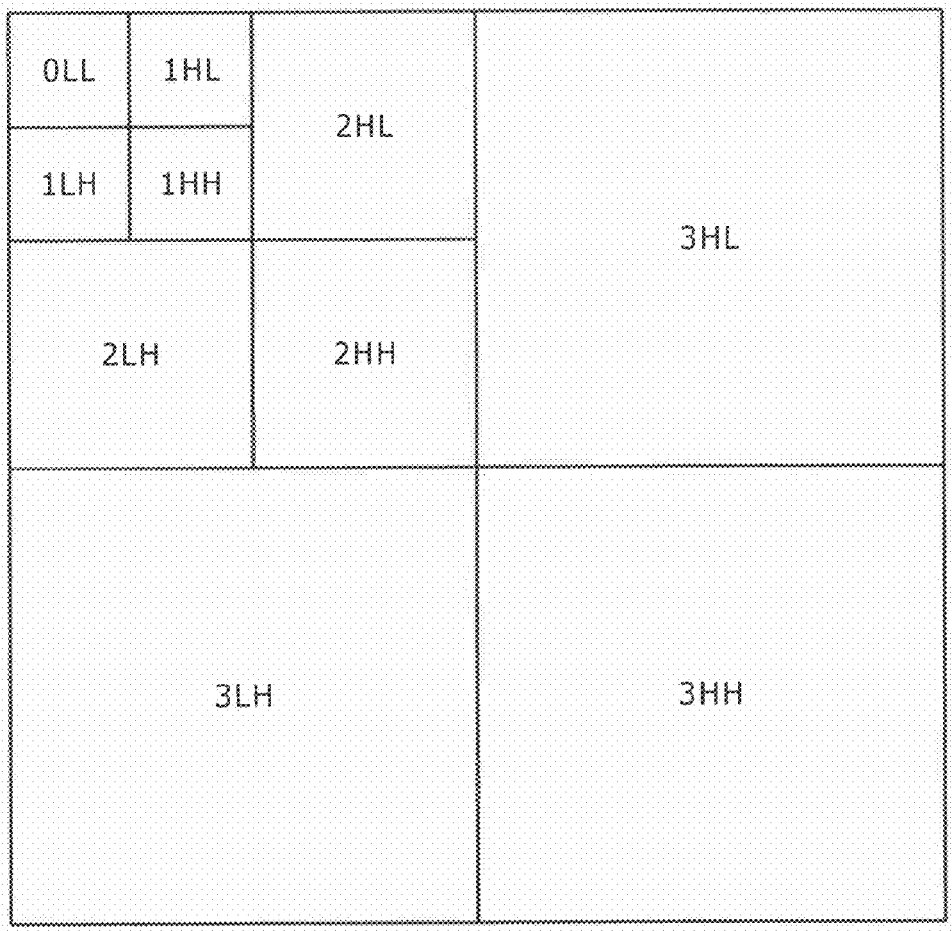
FIG. 3 is a diagram showing an example of subbands.

The wavelet transformer 152 recursively repeats such a filtering process on subbands which have been separated as low-frequency components in both the vertical and horizontal directions, by a plurality of times, as shown in FIG. 3. This is because much of the energy of the image data concentrates in the low-frequency components, as shown in FIG. 4.

FIG. 3 is a diagram showing an example of subbands that are generated by a wavelet transformation process having three division levels. First, the wavelet transformer 152 filters the entire image data into subbands 3LL (not shown), 3HL, 3LH, 3HH. Then, the wavelet transformer 152 filters the subband 3LL into subbands 2LL (not shown), 2HL, 2LH, 2HH. The wavelet transformer 152 filters the 2LL into subbands 0LL, 1HL, 1LH, 1HH.

Figure 4:
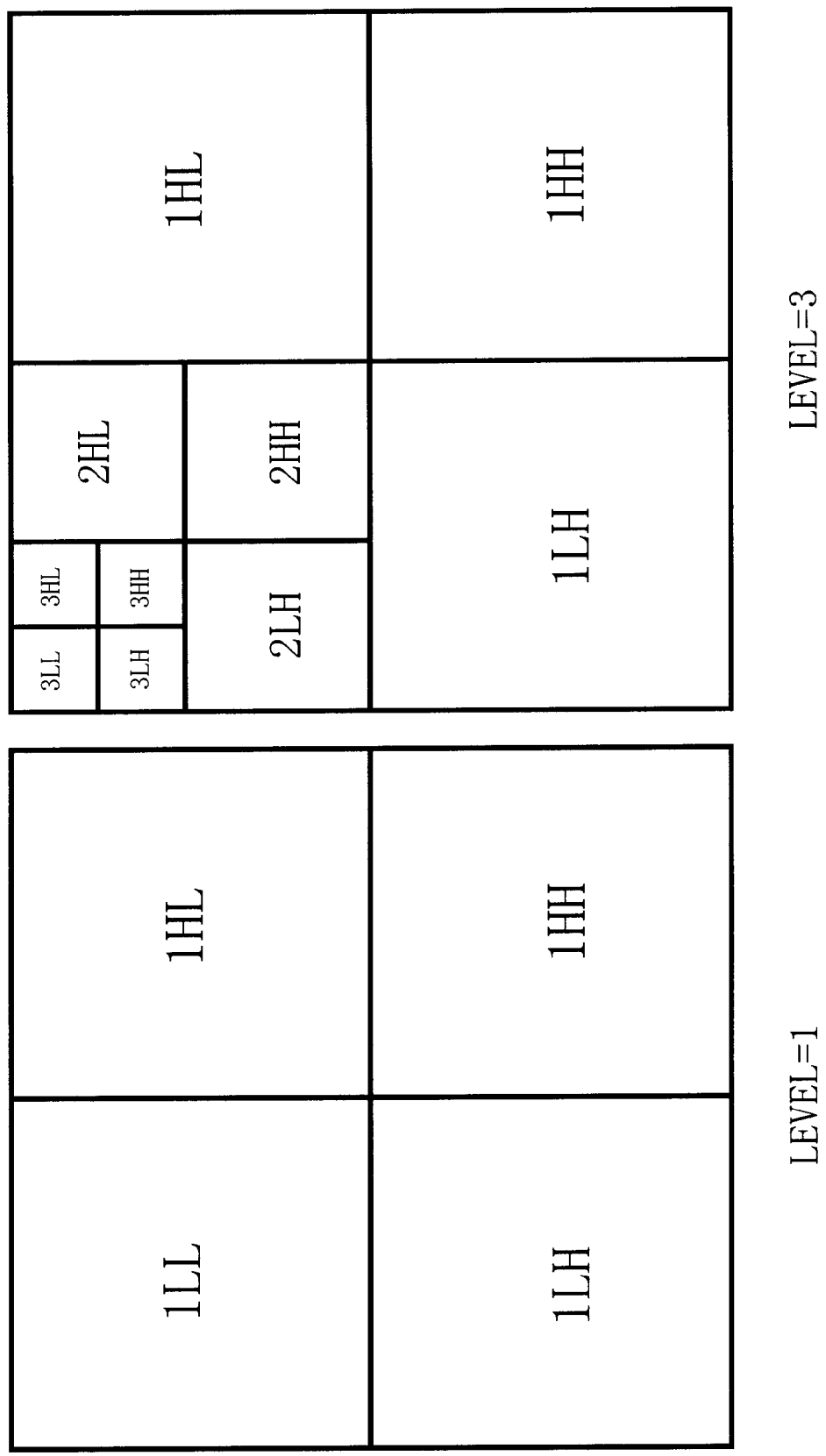
FIG. 4 is a diagram showing examples of subbands.

FIG. 4 shows the manner in which subbands are progressively generated through the different division levels. Specifically, FIG. 4 shows on its left side respective images in subbands produced by the wavelet transformation process at the first division level, and also shows on its right side respective images in subbands produced by the wavelet transformation process at the third division level. The images shown on the right side of FIG. 4 represent images in the subbands shown in FIG. 3.

The wavelet transformer 152 supplies the wavelet coefficients produced by the filtering process for each of the subbands to the quantizer 153. At this time, the wavelet transformer 152 supplies the subbands in the order of importance, i.e., in the descending order of importance. Generally, the wavelet transformer 152 supplies the subbands in the order from lower to higher frequencies to the quantizer 153.

The quantizer 153 quantizes the wavelet coefficients and supplies the quantized wavelet coefficients to code blocker 154. According to the JPEG 2000 standards, the quantizer 153 is dispensed with because all coded paths or bit planes are coded for lossless compression.

Figure 5:
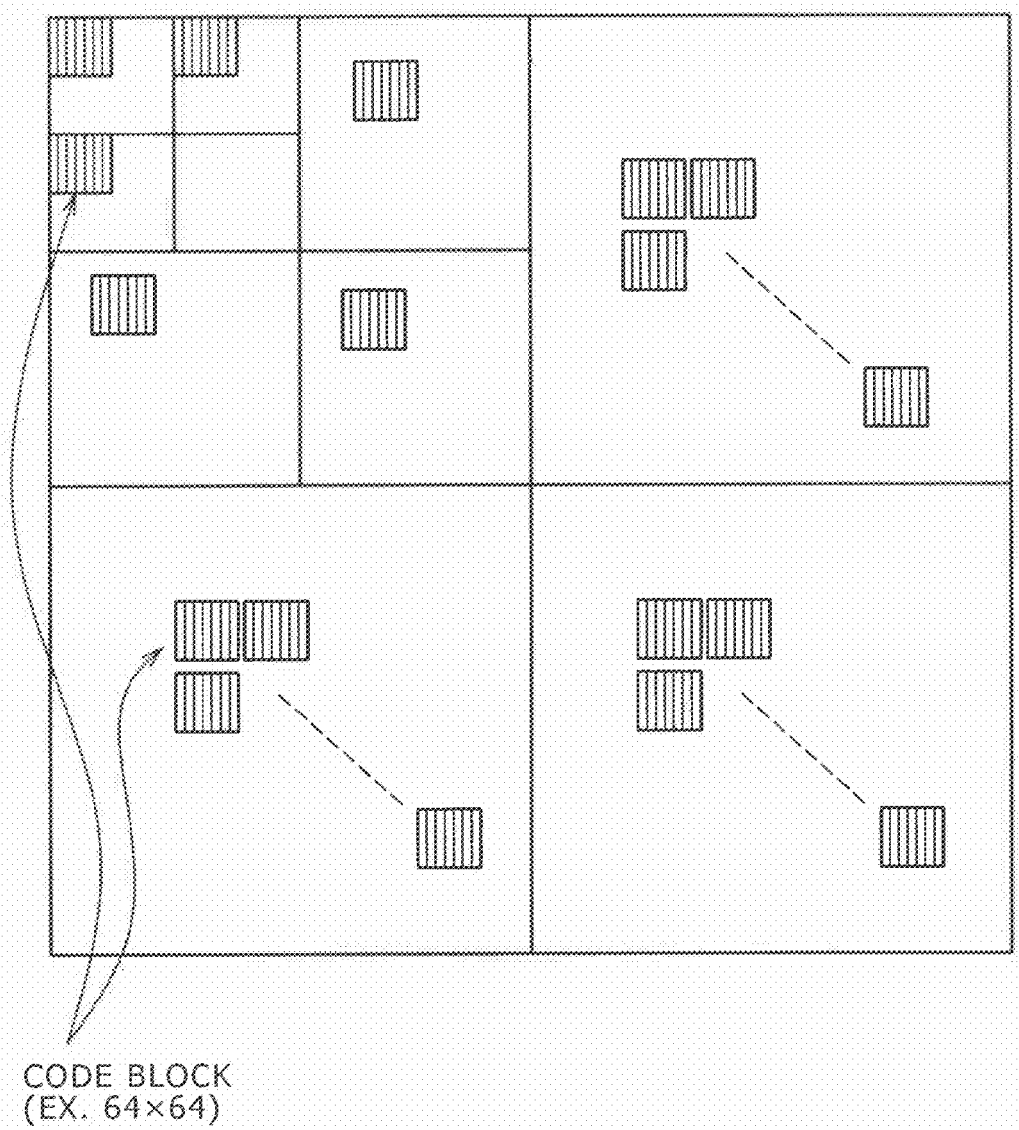
FIG. 5 is a diagram showing the positional relationship of code blocks in the subbands.

The code blocker 154 divides the wavelet coefficients into code blocks having a predetermined size which serve as units to be processed for entropy coding. FIG. 5 shows the positional relationship of the code blocks in the subbands. For example, code blocks having a size of 64×64 pixels are generated in all the subbands which have been divided. In the case of FIG. 3, if the subband 3HH at the smallest division level has a size of 640×320 pixels, then it contains a total of 50 code blocks having a size of 64×64 pixels. Each of the processing units in the subsequent stages processes each of the subblocks.

The code blocker 154 supplies the code blocks in the order of importance, i.e., in the descending order of importance, to the bit plane converter 155. The bit plane converter 155 converts the coefficient data into bit planes at the respective positions of bits, and supplies the bit planes to the EBCOT unit 156.

Bit planes represent divisions or slices at respective bit positions of a coefficient group which is made up of a predetermined number of wavelet coefficients. In other words, a bit plane is a set of bits (coefficient bits) representing wavelet coefficients at one bit position.

Figure 6:
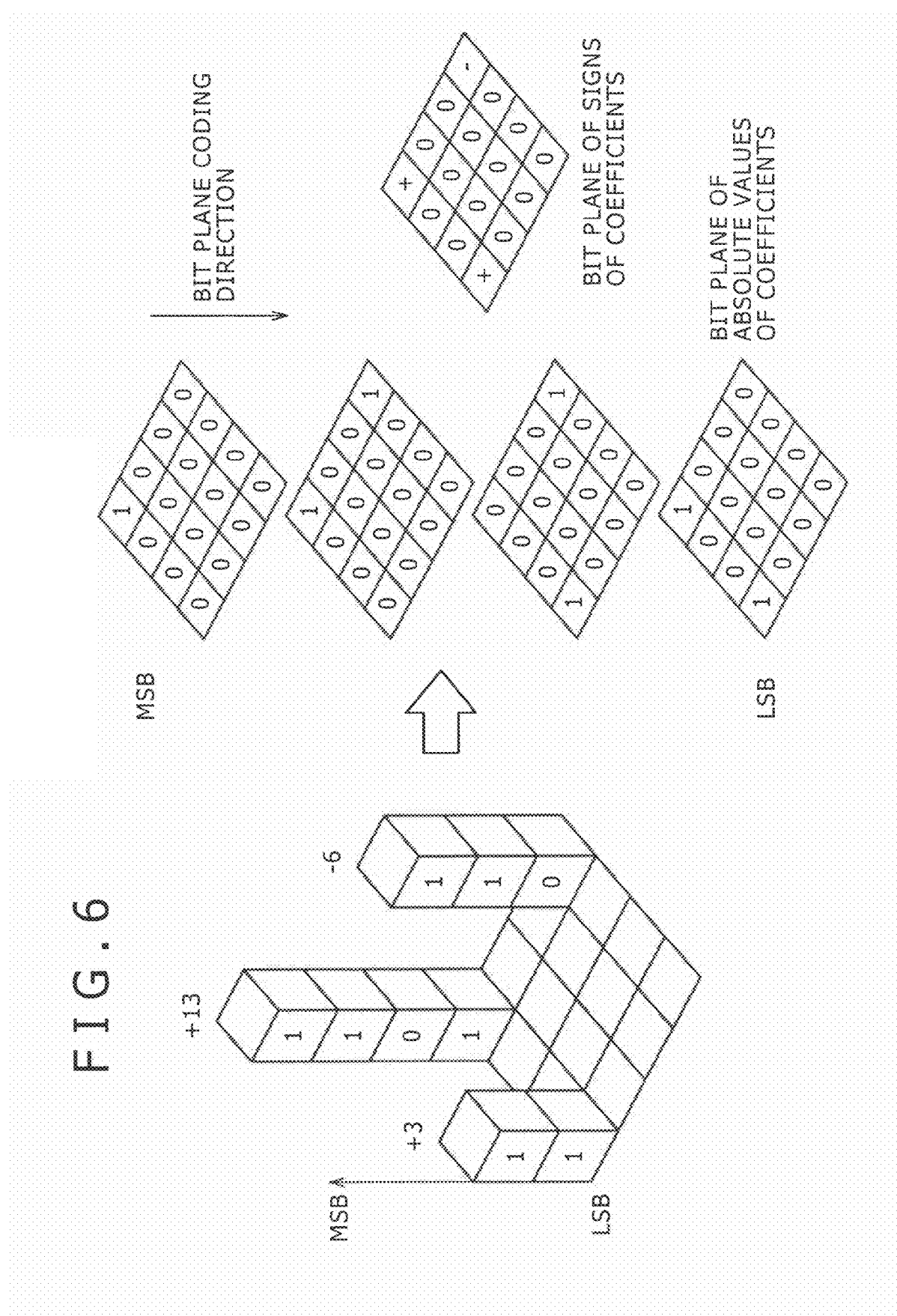
FIG. 6 is a diagram showing an example of bit planes.

FIG. 6 shows a specific examples of bit planes. FIG. 6 shows on its left side 16 coefficients in a matrix of 4×4 bits. Of the 16 coefficients, the coefficient whose absolute values is maximum represents 13 and is expressed as 1101 by the binary notation. The bit plane converter 155 converts the coefficients into four bit planes representing absolute values (absolute-value bit planes) and a single bit plane representing signs (sign bit plane). Specifically, the bit plane converter 155 converts the coefficients shown on the left side of FIG. 6 into four absolute-value bit planes shown on the central side of FIG. 6 and a single sign bit plane shown on the right side of FIG. 6. The absolute-value bit planes are made up of elements which may be of a value of either 0 or 1. The sign bit plane is made up of elements which may be a value indicating that the coefficient has a positive value, a value indicating that the coefficient has a value of 0, or a value indicating that the coefficient has a negative value.

The bit plane converter 155 supplies the bit planes in the order of importance, i.e., in the descending order of importance, to the EBCOT unit 156. The EBCOT unit 156 codes the bit planes of coefficient data in the order of importance, i.e., in the descending order of importance. For example, the EBCOT unit 156 codes each of the bit planes in the order from the most significant bit (MSB) to the least significant bit (LSB).

As shown in FIG. 2, the EBCOT unit 156 performs an entropy coding process referred to as EBCOT according to the JPEG 2000 standards on the supplied bit planes of coefficient data. The EBCOT is a process for coding each block having a predetermined size while measuring the statistics of the coefficients in the block.

The EBCOT unit 156 includes a bit modeler 161 and an arithmetic coder 162. The bit modeler 161 performs a bit modeling process on the coefficient data according to a procedure determined by the JPEG 2000 standards, and sends a context to the arithmetic coder 162. The arithmetic coder 162 converts the bit planes of coefficient data into arithmetic codes.

A code block has horizontal and vertical sizes each represented by a power of 2 in the range from 4 to 256. Code block sizes that are usually used include 32×32, 64×64, 128×32, for example. A coefficient value is expressed by an n-bit binary number with a sign, which includes bits 0 through (n−2) representative of bits from the MSB to the LSB and a remaining bit representative of the sign. Coded blocks are coded successively from the bit plane at the MSB according to the following three coding passes:

(1) Significance Propagation Pass

According to Significance Propagation Pass for coding a certain bit plane, the value of a bit plane of non-significant coefficients, whose at least one among eight nearby coefficients is significant, is arithmetically coded. If the arithmetically coded value of the bit plane is 1, then the information about whether the sign is positive or negative is arithmetically coded.

The term "significance" will be described below. The significance means that when each coefficient is coded, it changes to 1 indicating that it is significant, and will subsequently remain to be 1 at all times. Therefore, significance may serve as a flag indicating whether the information of a significant digit has already been coded or not. If a coefficient in a certain bit plane becomes significant, then it will remain significant in subsequent bit planes.

(2) Magnitude Refinement Pass

According to Magnitude Refinement Pass for coding a bit plane, the value of a bit plane of significant coefficients which have not been coded by Significance Propagation Pass is arithmetically coded.

(3) Cleanup Pass

According to Cleanup Pass for coding a bit plane, the value of a bit plane of non-significant coefficients which have not been coded by Significance Propagation Pass is arithmetically coded. If the arithmetically coded value of the bit plane is 1, then the information about whether the sign is positive or negative is arithmetically coded.

The above three arithmetic coding processes may be carried out as (1) ZC (Zero Coding), (2) RLC (Run-Length Coding), (3) SC (Sign Coding), (4) MR (Magnitude Refinement) or the like process depending on the actual application. In the present embodiment, an arithmetic code called MQ code is used. The MQ code is a learning-type binary arithmetic code prescribed by JBIG 2. According to JPEG 2000, there are a total of 19 types of context for all the coding passes.

Figure 7:
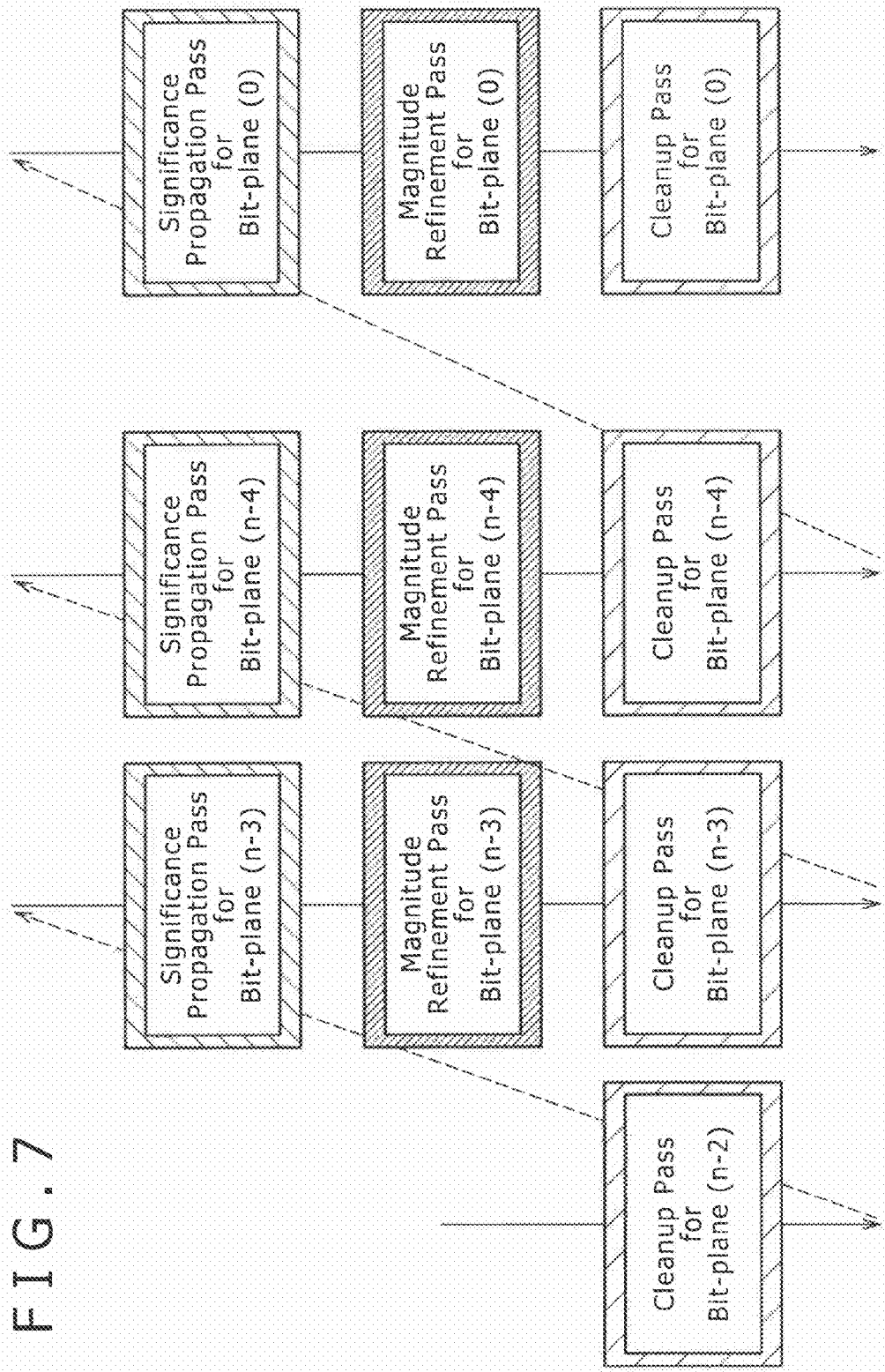
FIG. 7 is a diagram showing an example of coding passes.

FIG. 7 shows an example of a sequence in which the three coding passes are used. First, a bit plane (n−2) {Bit-plane (n−2)} at MSB is coded by Cleanup Pass. Then, successive bit planes are coded progressively toward LSB by the three coding processes, i.e., Significance Propagation Pass, Magnitude Refinement Pass, and Cleanup Pass, in the named order.

Actually, however, the EBCOT unit 156 performs a process of searching for a first bit plane which contains "1" in the direction from MSB to LSB. The EBCOT unit 156 records the information of such a first bit plane in a header, and does not code a bit plane whose all coefficients are 0 (zero bit plane).

Figure 8:
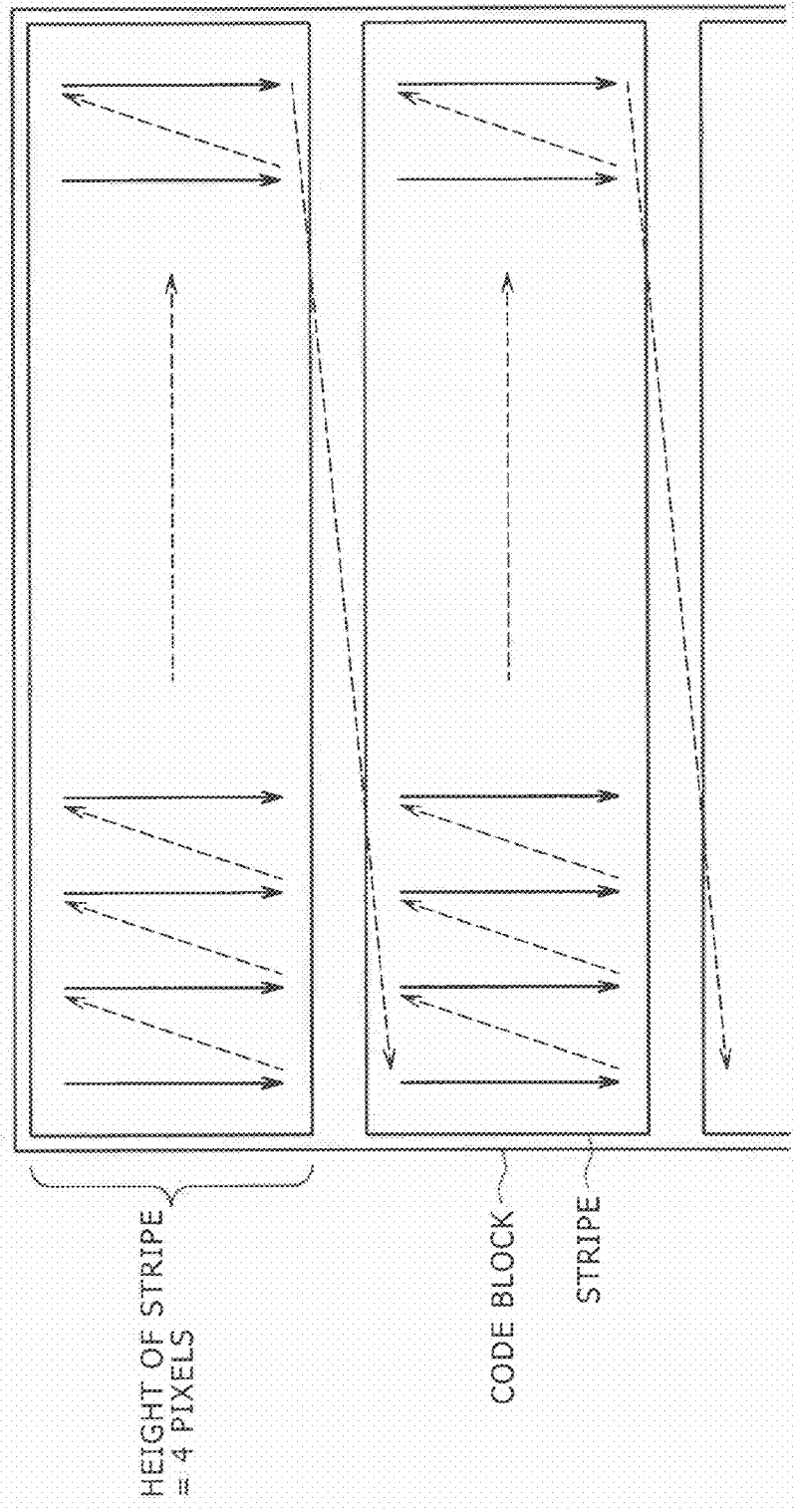
FIG. 8 is a diagram showing an example of a process of scanning coefficients.

A process of scanning coefficients will be described below with reference to FIG. 8. A code block is divided into stripes each having a height of four coefficients. Each of the stripes has a width equal to the width of the code block. A scanning sequence refers to a sequence in which all coefficients in a code block are traced. In the code block, the coefficients are scanned from higher to lower stripes. In each of the stripes, the coefficients are scanned from left to right columns. In each of the columns, the coefficients are scanned from higher to lower coefficients. According to each of the above coding passes, all the coefficients in the code blocks are scanned in the above scanning sequence.

Details of a coding sequence for subbands and entire image data will be described later. Basically, however, the EBCOT unit 156 codes coefficient bits in the descending order of importance.

As shown in FIG. 2, the arithmetic coder 162 of the EBCOT unit 156 supplies the generated coded code stream through a code quantity adder 172 of the controller 122 to the header generator 157 and the packet generator 158.

The header generator 157 generates header information, and supplies the generated header information to the packet generator 158. The packet generator 158 packetizes the coded code stream using the header information.

Figure 9:
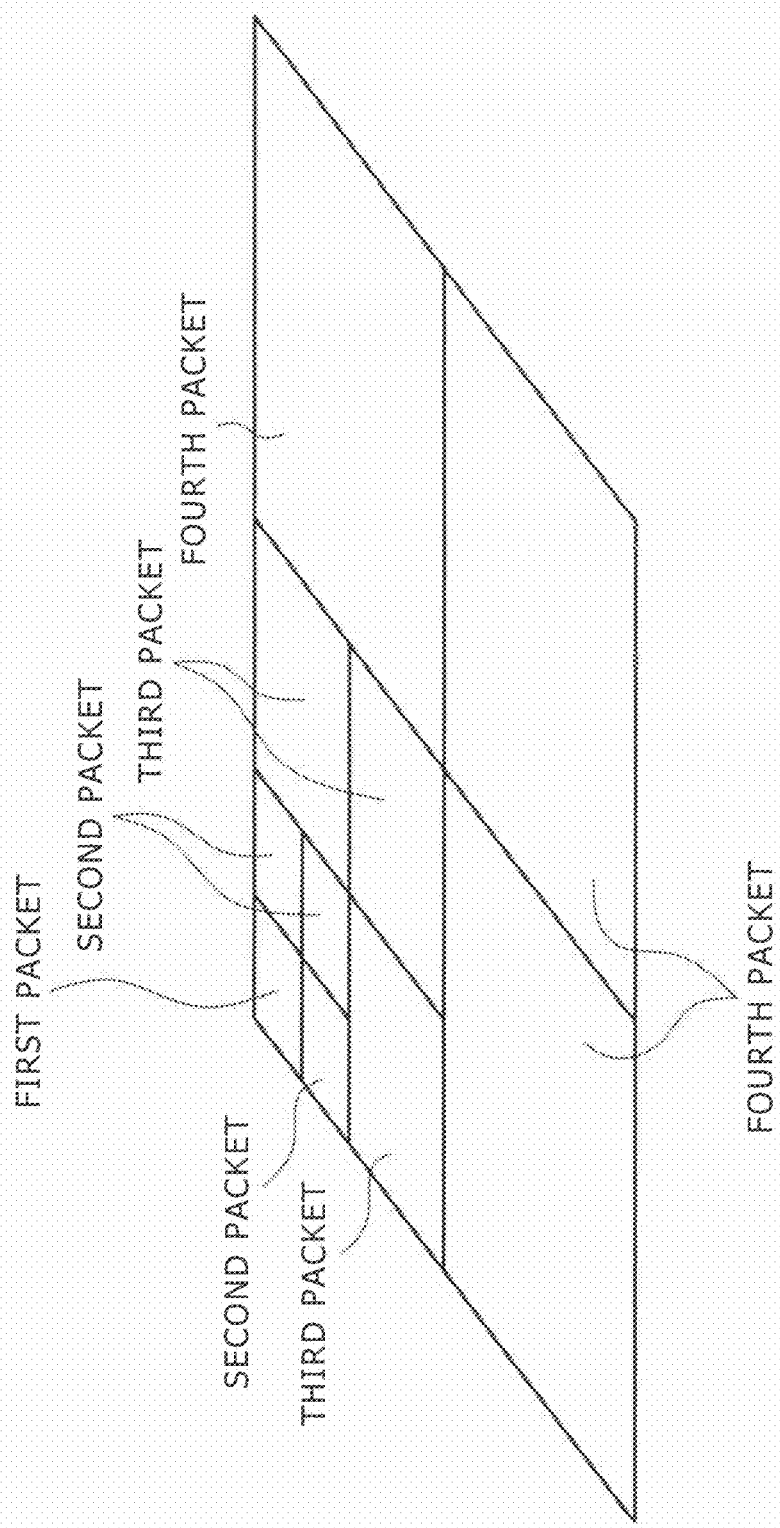
FIG. 9 is a diagram showing a concept of packets.

According to JPEG 2000, the coded code stream shen expressed is packed in units called packets. FIG. 9 shows a concept of packets. In the example shown in FIG. 9, the code stream is wavelet-transformed three times as with the example shown in FIG. 3. As shown in FIG. 9, four types of packets are generated which range from lowest-frequency first packets to highest-frequency fourth packets. The coded code stream of all code blocks which are present in the subbands in the individual packets is packed per packet by the packet generator 158, and then output from the encoder 102.

As shown in FIG. 2, the controller 122 of the encoder 102 includes a controller 171 and the code quantity adder 172.

The code quantity adder 172 counts and accumulates the number of codes supplied from the EBCOT unit 156. The code quantity adder 172 supplies the codes to the header generator 157 and the packet generator 158, and supplies the accumulated number of codes to the controller 171. The controller 171 compares the accumulated number of codes supplied thereto and a target code quantity input from the input unit 103 with each other. If the accumulated number of codes is smaller than the target code quantity, then the controller 171 controls the EBCOT unit 156 to code a next bit plane. Under the control of the controller 171, the EBCOT unit 156 codes a next important bit plane, and supplies generated codes to the code quantity adder 172. The code quantity adder 172 counts and accumulates the number of supplied codes, and supplies the accumulated number of codes to the controller 171.

The above process is repeated until the accumulated number of codes reaches the target code quantity. When the accumulated number of codes reaches the target code quantity, the controller 171 controls the EBCOT unit 156 to finish the coding process.

As described above, the code stream generator 121 codes the baseband image data while the controller 171 is controlling the EBCOT unit 156 based on the accumulated number of codes calculated by the code quantity adder 172.

The controller 171 also supplies the information about the target compression ratio (target number of codes) and the resolution of the image data of the output code stream (transformed code stream) input from the input unit 103 to the supply 123.

The supply 123 includes a resolution information supply 181, a target compression ratio supply 182, and a multiplexer 183. The resolution information supply 181 supplies information about the resolution of the image data of the output code stream supplied from the controller 171 to the multiplexer 183. The target compression ratio supply 182 supplies a target compression ratio for the partial decoder 101, which is calculated based on a target number of codes and an amount of master image data set in the controller 171, to the multiplexer 183. The multiplexer 183 multiplexes the information about the resolution supplied from the resolution information supply 181 and the information about the target compression ratio supplied from the target compression ratio supply 182, and supplies the multiplexed information as transform target information to the extractor 112 of the partial decoder 101.

The partial decoder 101 can perform its decoding process depending on the target compression ratio and the resolution, and can reduce an increase in the burden of unnecessary processing sequences even if the amount of master image data is large. The information about the target compression ratio and the information about the resolution may not be multiplexed, but may be supplied independently to the partial decoder 101.

Details of the partial decoder 101 shown in FIG. 1 will be described below.

Figure 10:
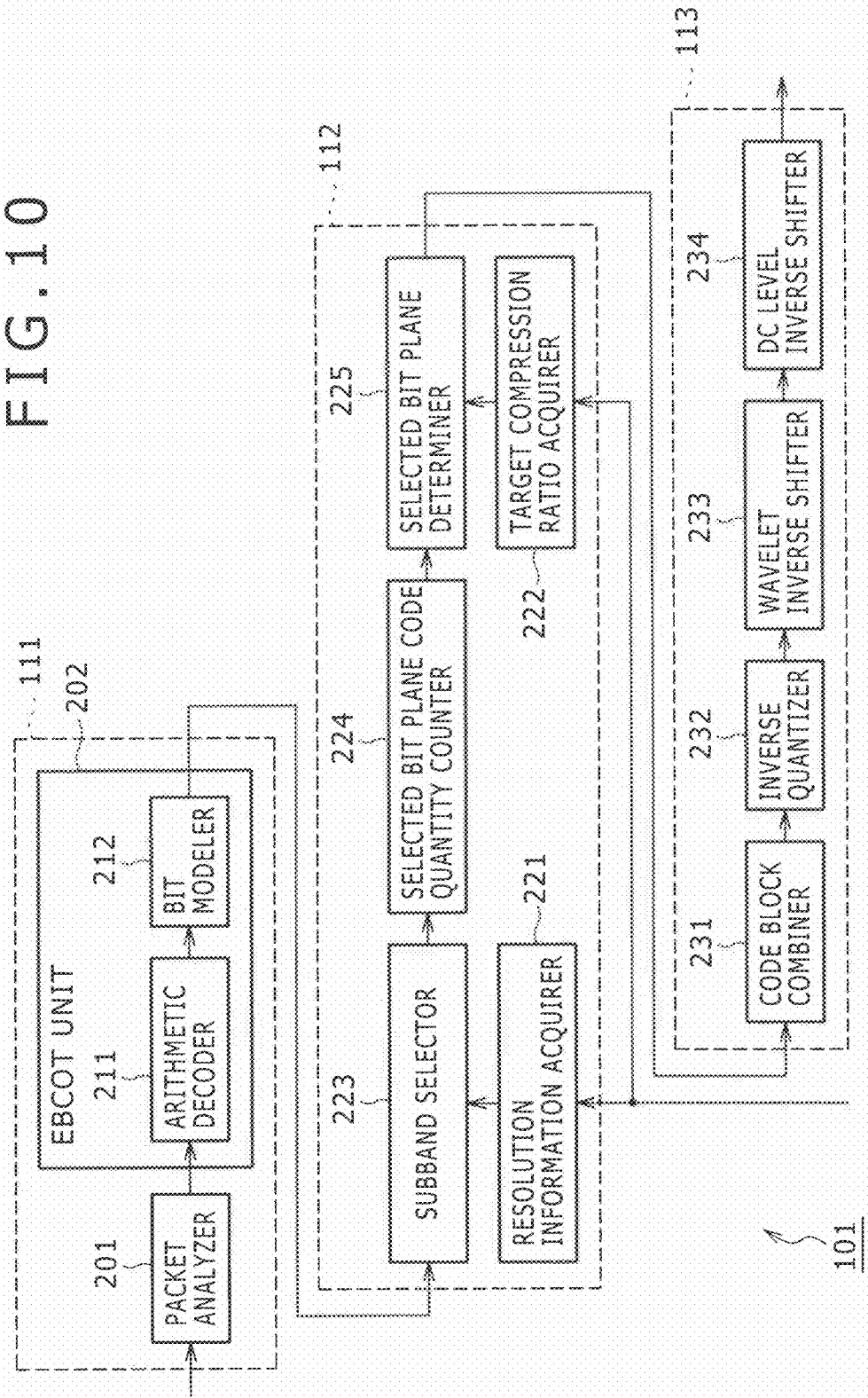
FIG. 10 is a block diagram showing a detailed configurational example of a partial decoder.

FIG. 10 shows in block form a detailed configurational example of the partial decoder 101. As shown in FIG. 10, the entropy decoder 111 of the partial decoder 101 includes a packet analyzer 201 and an EBCOT unit 202.

The packet analyzer 201 analyzes a packet input thereto, extracts a code stream from the packet, and supplies the extracted code stream to the EBCOT unit 202. The EBCOT unit 202 entropy-decodes the supplied code stream to generate wavelet coefficients as converted into bit planes. The EBCOT unit 202 includes an arithmetic decoder 211 and a bit modeler 212. The arithmetic decoder 211 decodes the code stream, and the bit modeler 212 generates wavelet coefficients as converted into bit planes from the decoded code stream. The EBCOT unit 202 supplies the coefficient data of each of the generated bit planes to a subband selector 223 of the extractor 112.

The extractor 112 includes a resolution information acquirer 221, a target compression ratio acquirer 222, the subband selector 223, a selected bit plane code quantity counter 224, and a selected bit plane determiner 225.

The resolution information acquirer 221 extracts and acquires resolution information from the transform target information supplied from the supply 123 of the encoder 102. Specifically, the resolution information acquirer 221 acquires the resolution information supplied from resolution information supply 181. The target compression ratio acquirer 222 extracts and acquires a target compression ratio from the transform target information supplied from the supply 123 of the encoder 102. Specifically, the target compression ratio acquirer 222 extracts the target compression ratio supplied from the target compression ratio supply 182.

The coefficient data supplied from the bit modeler 212 are in the form of arrays of coefficient data arranged per bit plane and subband. The subband selector 223 selects coefficient data in subbands to be used for baseband image data, based on the resolution information supplied from resolution information acquirer 221. Specifically, the subband selector 223 selects subbands required to generate image data having a resolution which is specified by the resolution information. The subband selector 223 supplies the selected subbands to the selected bit plane code quantity counter 224.

The selected bit plane code quantity counter 224 accumulates supplied bit planes. The selected bit plane code quantity counter 224 selects candidates for selected bit planes to be supplied to a subsequent stage, i.e., to be used as decoded results, from the accumulated bit planes, counts the number of codes of the candidates, and supplies the count, i.e., information about the counted number of codes, to the selected bit plane determiner 225. The target compression ratio acquirer 222 acquires a target compression ratio from the transform target information, and supplies the acquired target compression ratio to the selected bit plane determiner 225. The target compression ratio represents the number of codes of baseband image data required for the encoder 102 to achieve the target number of codes, as a compression ratio with respect to the master image data (original image data).

The selected bit plane determiner 225 calculates a compression ratio of the candidates for the selected bit planes with respect to the master image data, using the number of codes of the candidates for the selected bit planes which are supplied from the selected bit plane code quantity counter 224, and determines whether or not the calculated compression ratio is equal to or smaller than the target compression ratio supplied from the target compression ratio acquirer 222. When the calculated compression ratio reaches the target compression ratio, the selected bit plane determiner 225 acquires the candidates for the selected bit planes from the selected bit plane code quantity counter 224, determines the acquired candidates as the selected bit planes, and supplies the determined selected bit planes to a code block combiner 231 of the baseband generator 113.

As described above, since the extractor 112 selects some bit planes depending on the transform target information acquired from the encoder 102, the baseband generator 113 can generate baseband image data using only the selected bit planes. Therefore, the partial decoder 101 can generate baseband image data in a quantity required by the encoder 102 or in a quantity slightly greater than the quantity required by the encoder 102.

Specifically, the partial decoder 101 generates baseband image data using only some of the code streams input thereto. The partial decoder 101 has generated at least a quantity of data required for the encoder 102 to code, i.e., the target number of codes and the number of codes required to achieve the resolution, by performing the partial decoding process based on the transform target information supplied from the encoder 102. Consequently, the encoder 102 can generate code streams without causing unwanted image quality reductions. In other words, the transcoder 100 can transcode code streams without causing unwanted image quality reductions. Because of the partial decoding process described above, the partial decoder 101 is not required to generate baseband image data of unnecessarily high image quality, but is capable of reducing an increase in the burden of unnecessary processing sequences, i.e., is capable of performing the decoding process easily, without unnecessarily lowering the image quality even if the amount of master image data is large.

The selected bit plane code quantity counter 224 preferentially selects bit planes of higher importance as candidates for selected bit planes. Specifically, the selected bit plane code quantity counter 224 selects one at a time of accumulated bit planes in the descending order of importance as a candidate for a selected bit plane, calculates the number of codes each time a candidate for a selected bit plane is selected, and supplies the information of the selected candidate to the selected bit plane determiner 225.

Stated otherwise, the partial decoder 101 preferentially decodes data of higher importance to generate baseband image data. By thus partially decoding the data, the partial decoder 101 can perform the decoding process appropriately to minimize a reduction in the image quality as much as possible.

The baseband generator 113 includes the code block combiner 231, an inverse quantizer 232, a wavelet inverse transformer 233, and a DC level inverse shifter 234.

The code block combiner 231 generates coefficient data in code blocks using the supplied bit planes, combines the coefficient data into coefficient data in subbands, and supplies the coefficient data to the inverse quantizer 232. The inverse quantizer 232 inversely quantizes the supplied coefficient data, and supplies the inversely quantized coefficient data to the wavelet inverse transformer 233. If losslessly coded streams are input to the transcoder 100, then the inverse quantizer 232 is dispensed with. The wavelet inverse transformer 233 wavelet-inverse-transforms the supplied wavelet coefficients to generate baseband image data. The DC level inverse shifter 234 performs a DC level inverse shift process to restore the level of the DC component of the image data which are shifted when they are coded as needed. The DC level inverse shifter 234 supplies the DC-level-restored image data to the encoder 102.

The importance of coefficients will be described below. Basically, the partial decoder 101 and the encoder 102 decode and code coefficient bits in the descending order of importance unlike decoders and encoders which carry out a rate control process based on existing RD (Rate-Distortion) process.

Figure 11:
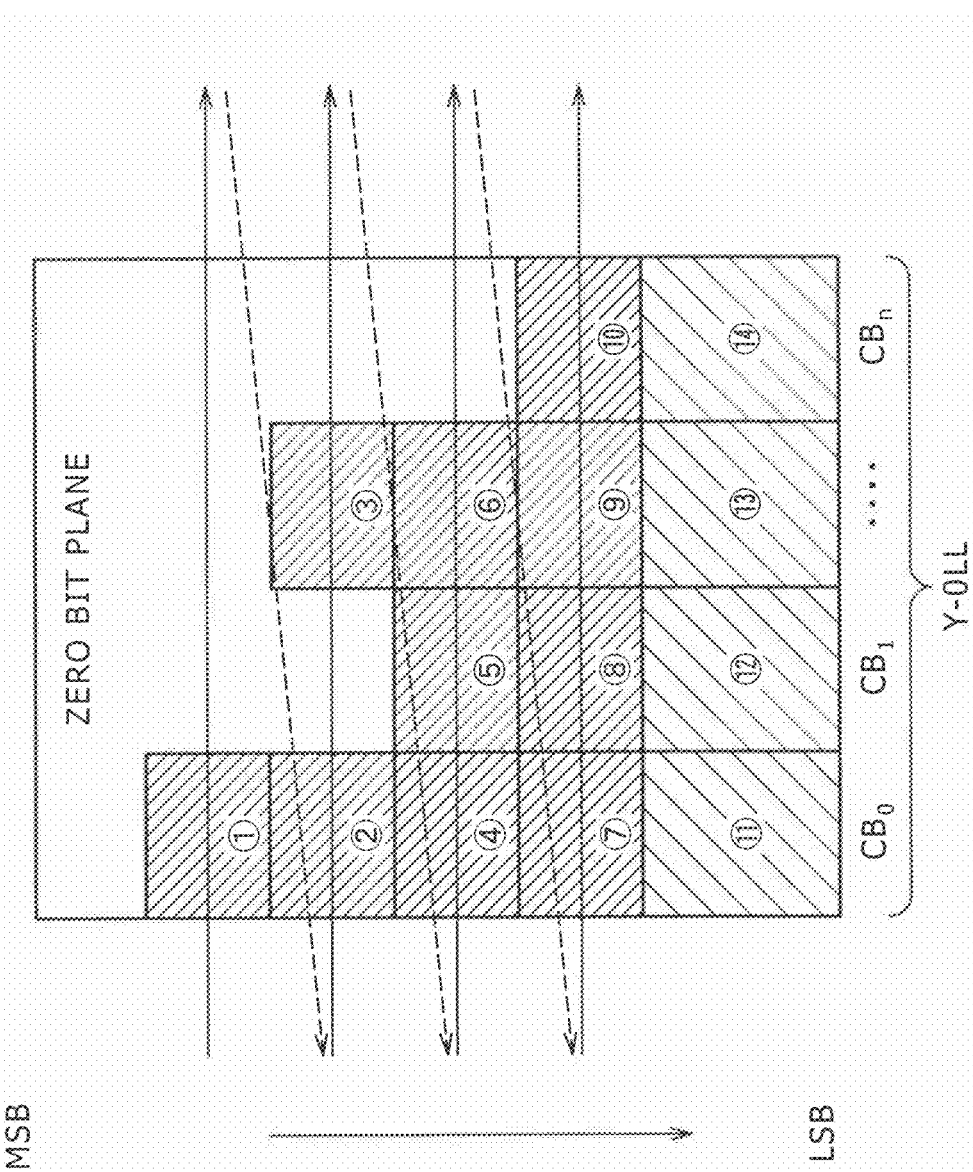
FIG. 11 is a diagram showing an example of a scanning sequence for each subband.

FIG. 11 shows an example of a scanning sequence for coding or decoding a subband Y-0LL where Y represents luminance and 0LL a lowest-frequency range. In FIG. 11, the subband Y-0LL includes (n+1) code blocks ranging from a code block $CB_0$ to a code block $CB_n$. The bit planes in the code blocks are shown as gridded or stippled.

As shown in FIG. 11, the EBCOT unit 156 and the EBCOT unit 202 code and decode the bit planes in the code blocks in the subband in the order from code blocks of higher priority to code blocks of lower priority. The code block $CB_0$ is of the highest priority (highest importance), and the code block $CB_n$ is of the lowest priority (lowest importance). Since the bit planes are coded and decoded in the order from MSB to LSB as described above, the bit planes in the subband Y-0LL are coded and decoded in the directions indicated by the arrows.

As bit planes whose all coefficients are 0 are not processed, the bit planes are actually processed in the numerical order from (1) to (14) in FIG. 11. Though the numbers are enclosed in circle in FIG. 11, they are placed in parentheses in the description. The first bit plane which is processed by the EBCOT unit 156 and the EBCOT unit 202 is the bit plane (1) in the highest bit position. Since only the bit plane (1) is present in the highest bit position, only the bit plane (1) is processed by the EBCOT unit 156 and the EBCOT unit 202. The processing goes to a next bit position as indicated by the dotted-line arrow. In the next bit position, the bit planes (2), (3) are processed by the EBCOT unit 156 and the EBCOT unit 202.

A process of adjusting an amount of data will be described below.

In the encoder 102, the bit planes are repeatedly scanned as described above, the number of codes generated from each of the bit planes by the EBCOT unit 156 is added, and the process of the EBCOT unit 156 is finished when the accumulated number reaches the target number of codes. For example, in FIG. 11, if the target number of codes is reached when the bit planes are coded up to the bit plane (9), then the controller 171 controls the EBCOT unit 156 to finish the coding process. In this example, the bit plane (10) is not included in the coded code stream output from the encoder 102 though the bit plane (10) is in the same bit position as the bit plane (9).

In the partial decoder 101, the EBCOT unit 202 decodes the supplied codes in the same scanning order. The selected bit plane code quantity counter 224 selects the bit planes as candidates for selected bit planes in the order in which they are output from the EBCOT unit 202, and counts the number of codes of the candidates. Specifically, the selected bit plane code quantity counter 224 counts the number of each of the bit planes in the order from the bit plane (1) to the bit plane (14).

The selected bit plane determiner 225 calculates a compression ratio of the candidates for the selected bit planes with respect to the master image data based on the amount of codes supplied from the selected bit plane code quantity counter 224, and compares the calculated compression ratio with the target compression ratio supplied from the target compression ratio acquirer 222.

When the compression ratio of the candidates for the selected bit planes satisfies the two equations shown below and reaches the target compression ratio, the selected bit plane determiner 225 formerly determines the candidates for the selected bit planes as selected bit planes.

(Target compression ratio)≦(Data size of master image data)/(The sum of the numbers of codes of the bit planes (1) through (9))

(Target compression ratio)≧(Data size of master image data)/(The sum of the numbers of codes of the bit planes (1) through (10))

The extractor 112 of the partial decoder 101 adjusts the amount of decoded data.

In summary, the partial decoder 101 and the encoder 102 code and decode coefficient data and codes in the order of importance. The partial decoder 101 and the encoder 102 also selects data in the order of importance, thereby adjusting the amount of data.

The process of scanning the bit planes in one subband has been described above. The transcoder 100 processes the subbands of entire image data, one at a time, in a predetermined order, i.e., processes entire image data subband by subband.

Figure 12:
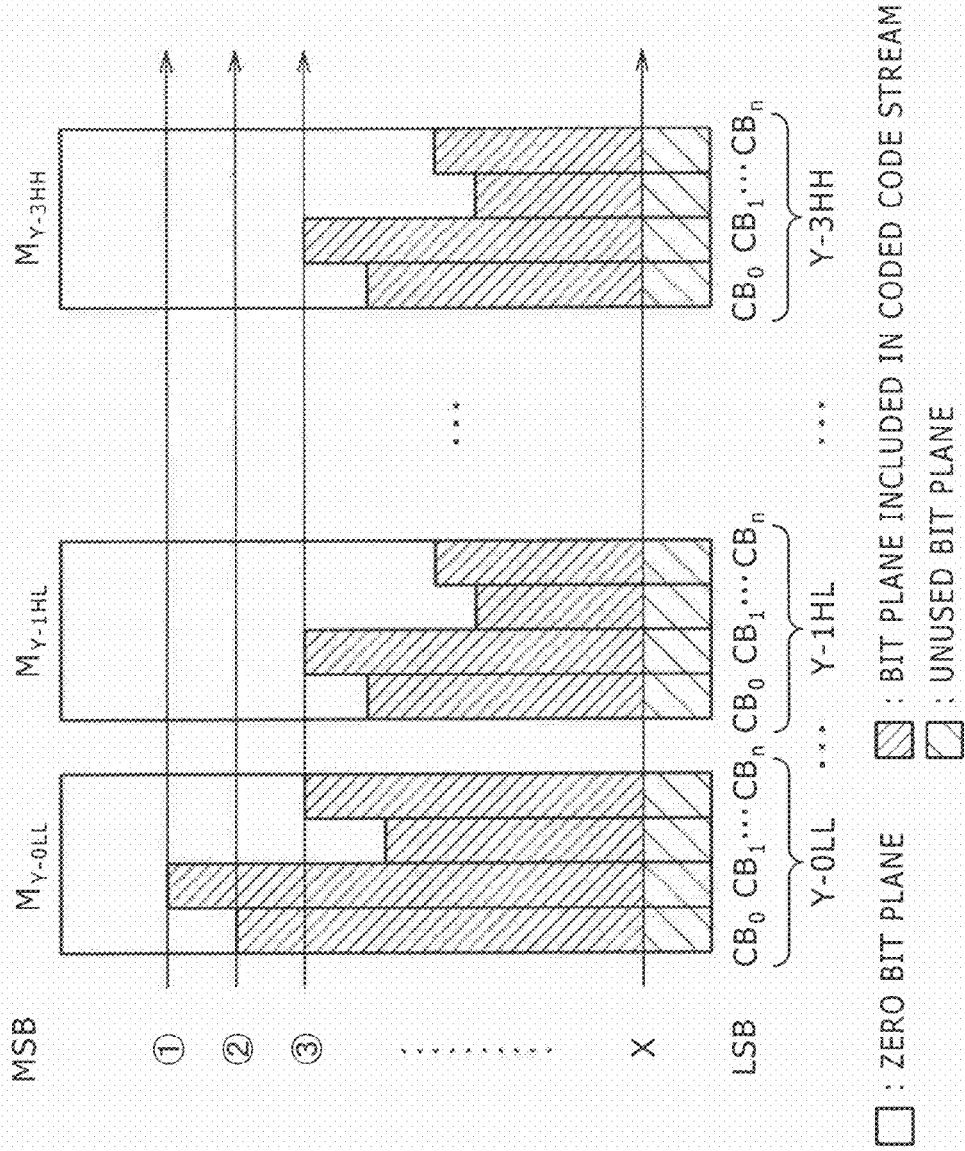
FIG. 12 is a diagram showing an example of a scanning sequence for each component.

However, the coefficient data and codes may be coded and decoded in other scanning orders. For example, as shown in FIG. 12, the transcoder 100 may process image data per component. FIG. 12 shows an example in which each bit position is scanned for a Y component (luminance component) over all subbands.

In FIG. 12, subbands are arrayed in an order according to their importance, i.e., in the order from a low-frequency subband 0LL to a high-frequency subband 3HH. In each of the subbands, code blocks are arrayed in an order of importance, i.e., in the order from a code block $CB_0$ to a code block $CB_n$. The bit planes thus arranged are processed in the order from MSB to LSB as indicated by the arrows in each bit position. In a third scanning cycle, for example, not only a bit plane Y-0LL, but also bit planes Y-1HL, Y-3HH are processed.

Figure 13:
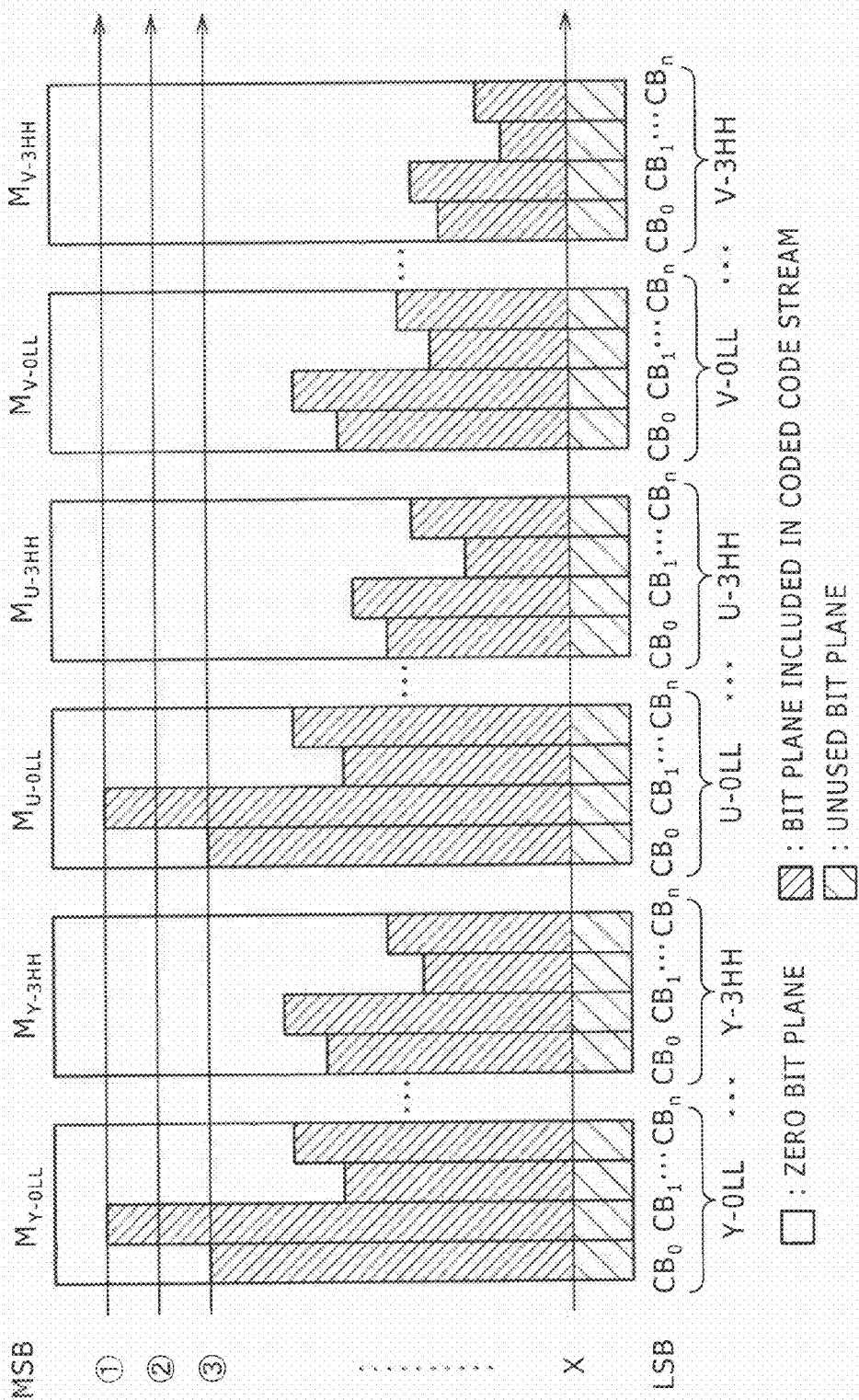
FIG. 13 is a diagram showing an example of a scanning sequence for an entire image.

If image data are made up of a plurality of components, then the transcoder 100 may process image data through all components. FIG. 13 shows an example in which each bit position is scanned for all components including Y, U, and V components over all subbands.

In FIG. 13, components including Y components (luminance components), U components (color difference components), and V components (color difference components) are arrayed in an order according to their importance, i.e., in the order from Y, U, and V components. In each of the components, subbands are arrayed in an order according to their importance, i.e., in the order from a low-frequency subband 0LL to a high-frequency subband 3HH. In each of the subbands, code blocks are arrayed in an order of importance, i.e., in the order from a code block $CB_0$ to a code block $CB_n$. The bit planes thus arranged are processed in the order from MSB to LSB in each bit position. In a first scanning cycle, for example, not only a bit plane in Y-0LL, but also a bit plane in U-0LL is processed.

More specifically, the EBCOT unit 156 initially scans all code blocks in all subbands (from 0LL to 3HH) for the Y component at a bit position closest to MSB where a bit plane which is not a zero bit plane is present, and if there is a bit plane which is not a zero bit plane, then the EBCOT unit 156 codes the bit plane. Then, the EBCOT unit 156 scans all code blocks in all subbands (from 0LL to 3HH) for the U component in the same bit position, and if there is a bit plane which is not a zero bit plane, then the EBCOT unit 156 codes the bit plane. Thereafter, the EBCOT unit 156 scans all code blocks in all subbands (from 0LL to 3HH) for the V component in the same bit position, and if there is a bit plane which is not a zero bit plane, then the EBCOT unit 156 codes the bit plane.

When the scanning process is finished up to the subband V-3HH in the same bit position, the EBCOT unit 156 then scans the code blocks in a next lower bit position.

In FIG. 12, each bit position is scanned per component. In FIG. 13, if image data are made up of a plurality of components, then the components are scanned in the order of importance. Specifically, if image data are made up of Y, U, and V components and their importance is in the named descending order, then the most important Y component is initially processed, thereafter the U component is processed, and finally the least important V component is processed.

Figure 14:
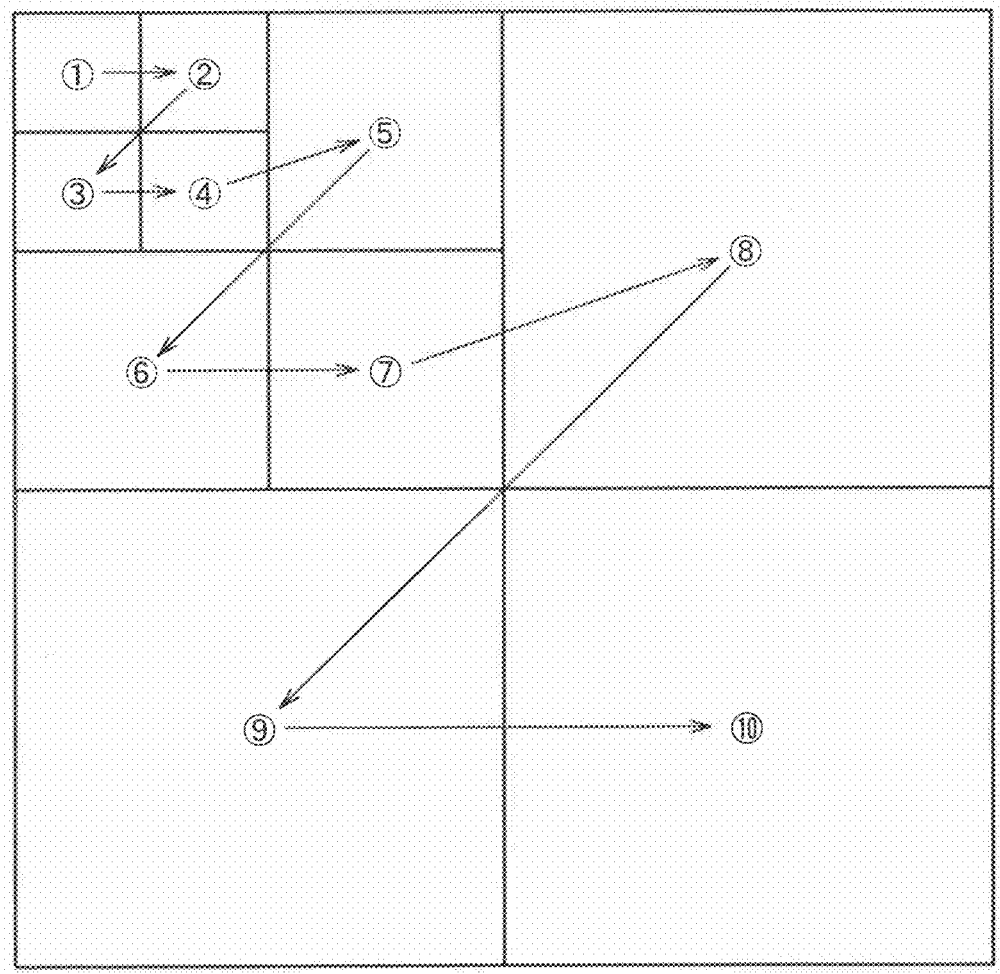
FIG. 14 is a diagram showing an example of a processing sequence for each block.

In FIG. 11, each bit position is scanned subband by subband. In the case, the subbands are scanned in the order of importance. Specifically, the image data are made up of subbands ranging from 0LL to 3HH, as shown in FIG. 12. If their importance is in the named descending order, then the most important 0LL subbands are initially processed, and thereafter the 1LH subbands are processed. Then, the less important subbands are successively processed, and the least important subbands 3HH are finally processed. For example, the subbands are processed in the sequence shown in FIG. 14.

The scanning sequence is determined in advance. In other words, the importance of each bit plane is determined in advance, and the partial decoder 101 and the encoder 102 have a common recognition of the predetermined importance of each bit plane.

An example of the above coding and decoding processes will be described below.

Figure 15:
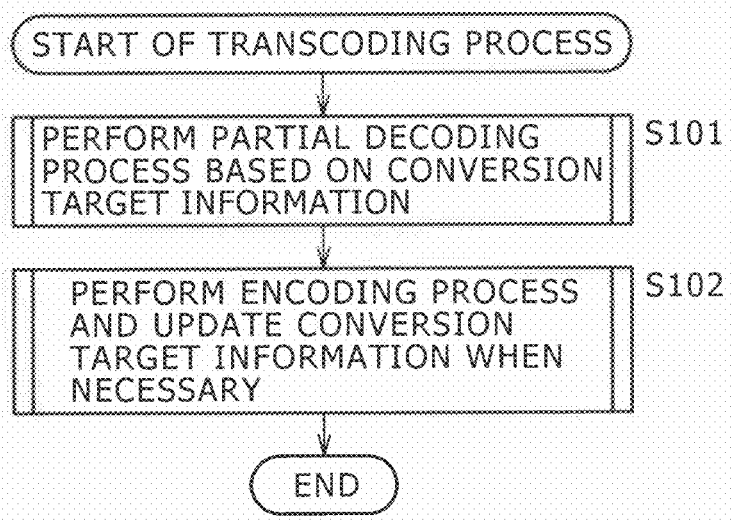
FIG. 15 is a flowchart of an example of a transcoding process.

First, a transcoding process carried out by the transcoder 100 will be described below with reference to a flowchart shown in FIG. 15.

When a code stream is input to the partial decoder 101 and the transcoding process is started, the partial decoder 101 partially decodes the input code stream into baseband image data based on the transform target information at the time in step S101. When the partial decoder 101 finishes its partial decoding process, the encoder 102 encodes the baseband image data from the partial decoder 101 and updates the transform target information when necessary in step S102.

The transcoder 100 performs the above transcoding process on each frame of the image data of the input code stream. The encoder 102 can successively encodes the baseband image data output from the partial decoder 101. Stated otherwise, step S101 and step S102 may be executed parallel to each other at the same time.

Figure 16:
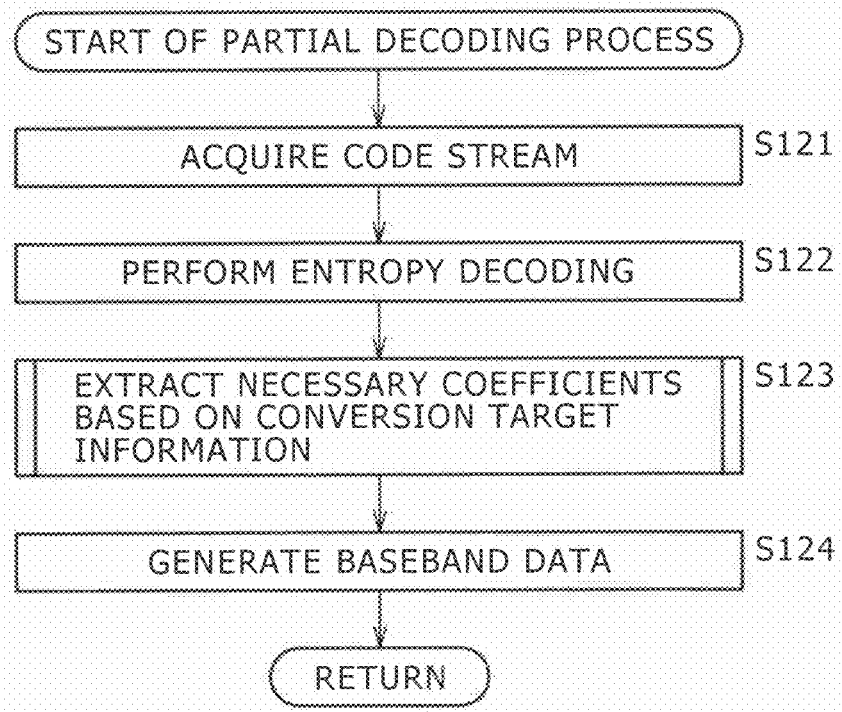
FIG. 16 is a flowchart of an example of a partial decoding process.

The partial decoding process which is carried out by the partial decoder 101 in step S101 shown in FIG. 15 will be described in detail below with reference to a flowchart shown in FIG. 16.

When the partial decoding process is started, the packet analyzer 201 of the entropy decoder 111 of the partial decoder 101 acquires a code stream from a received packet in step S121. Then, the EBCOT unit 202 entropy-decodes the acquired code stream in step S122. The extractor 112 extracts necessary coefficient data from the coefficient data produced in step S122, based on the transform target information at the time in step S123. The baseband generator 113 wavelet-inverse-transforms the extracted coefficient data to generate baseband image data in step S124.

When step S124 is finished, the partial decoding process carried out by the partial decoder 101 is put to an end. Control then returns to step S101 shown in FIG. 15 and goes to step S102.

Figure 17:
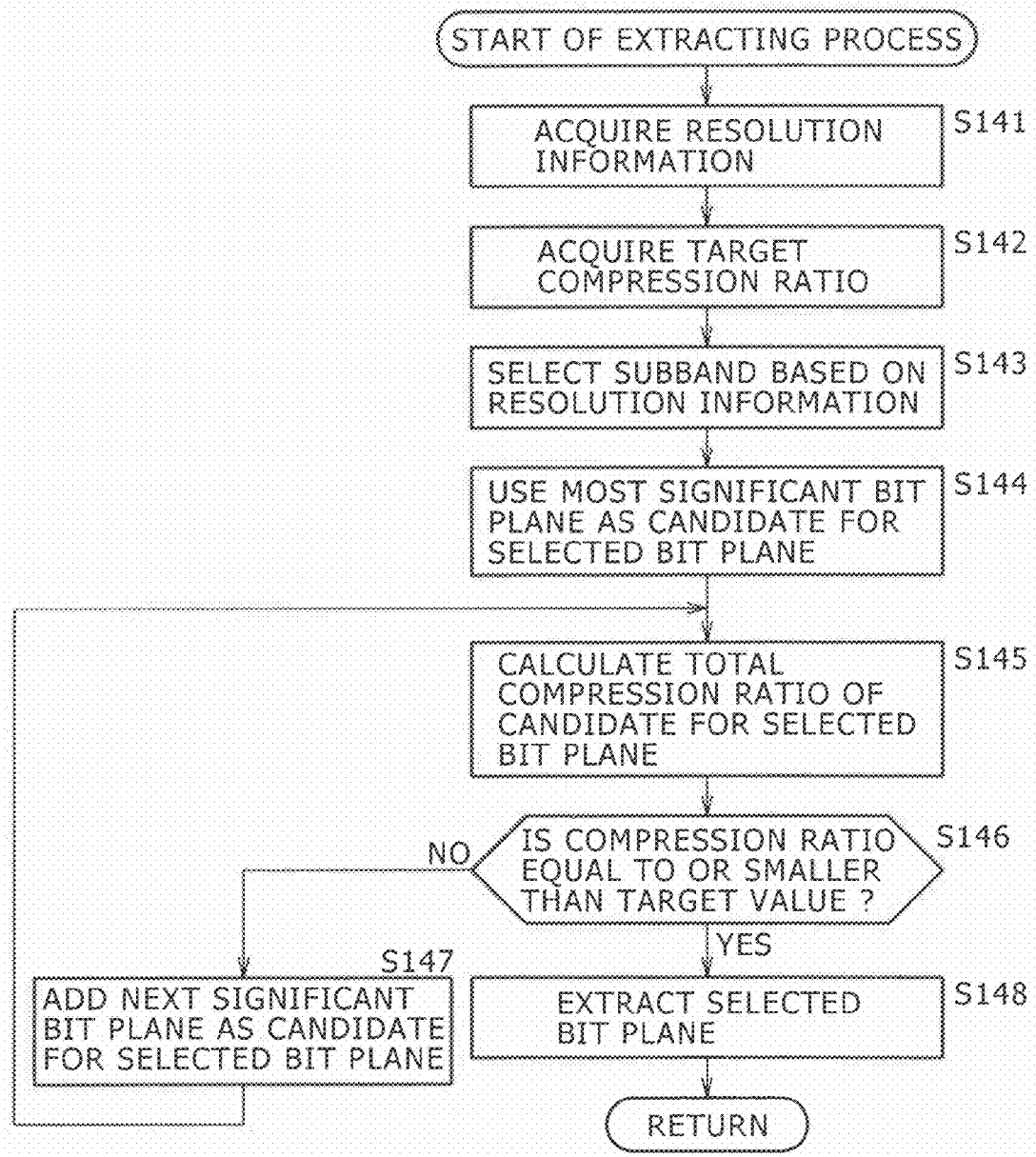
FIG. 17 is a flowchart of an example of an extracting process.

The extracting process which is carried out by the extractor 112 in step S123 shown in FIG. 16 will be described in detail below with reference to a flowchart shown in FIG. 17.

When the extracting process is started, the resolution information acquirer 221 acquires resolution information from the transform target information in step S141. The target compression ratio acquirer 222 acquires a target compression ratio from the transform target information in step 142. Based on the resolution information acquired in step S141, the subband selector 223 selects subbands required to generate image data having a resolution which is specified by the acquired resolution information, as subbands to be processed, in step S143.

The selected bit plane code quantity counter 224 holds the coefficients (bit planes) of the selected subbands, selects the most important bit plane among the bit planes held thereby, i.e., the subbands to be processed, as a candidate for a selected bit plane, and calculates the number of codes thereof in step S144. In step S145, the selected bit plane determiner 225 calculates a compression ratio of the candidate for the selected bit plane at the time with respect to master image data, i.e., original image data, based on the number of codes counted by the selected bit plane code quantity counter 224. The selected bit plane determiner 225 then determines, in step S146, whether or not the calculated compression ratio is equal to or smaller than the target compression ratio acquired in step S142.

If it is determined that the compression ratio of the candidate for the selected bit plane is greater than the target compression ratio, i.e., if the number of codes of the candidate for the selected bit plane is not sufficiently large, then control goes to step S147. In step S147, the selected bit plane code quantity counter 224 selects a next important bit plane among the bit planes held thereby, i.e., the subbands to be processed, as a candidate for a selected bit plane, and calculates the number of codes thereof. Control then goes back to step S145 to repeat the processing from step S145. In other words, until the calculated compression ratio becomes equal to or smaller than the target compression ratio, the selected bit plane code quantity counter 224 and the selected bit plane determiner 225 repeatedly execute steps S145, S146, S147 to increase the number of counts of the candidate for the selected bit plane.

If it is determined that the compression ratio of the candidate for the selected bit plane is equal to or smaller than the target compression ratio in step S146, then control goes to step S148 in which the selected bit plane determiner 225 extracts the selected bit plane and supplies the selected bit plane to the code block combiner 231. Thereafter, the extracting process is put to an end. Control returns to step S123 shown in FIG. 16, and goes to step S124.

The extractor 112 performs the extracting process as described above to extract coefficient data in order to satisfy the conditions of the resolution and the compression ratio specified by the transform target information.

Figure 18:
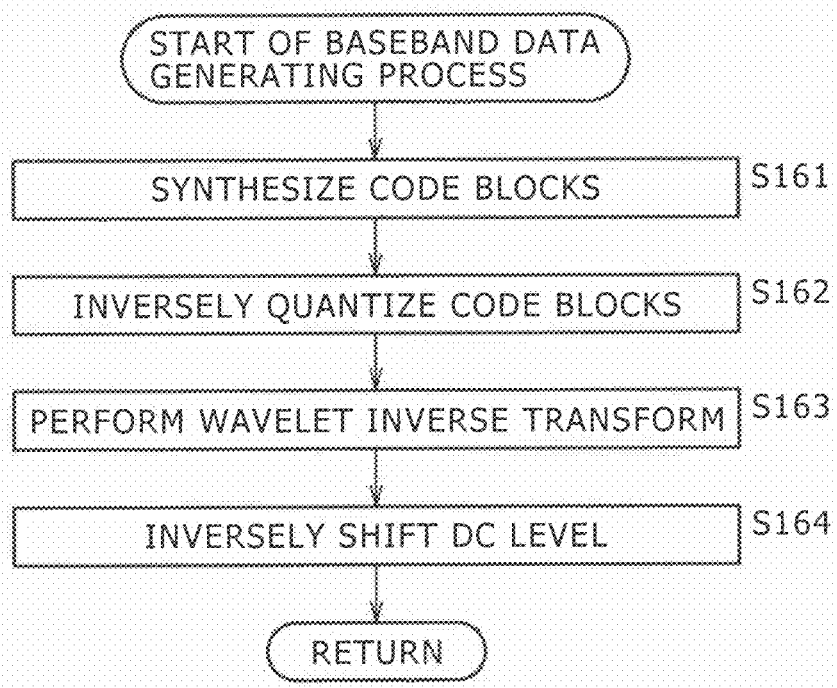
FIG. 18 is a flowchart of an example of a baseband data generating process.

The baseband data generating process which is carried out by the baseband generator 113 in step S124 shown in FIG. 16 will be described in detail below with reference to a flowchart shown in FIG. 18.

When the baseband data generating process is started, the code block combiner 231 combines code blocks using selected bit planes supplied from the selected bit plane determiner 225 in step S161. The inverse quantizer 232 inversely quantizes the combined code blocks in step S162. The wavelet inverse transformer 233 wavelet-inverse-transforms the inversely quantized coefficient data in step S163. The DC level inverse shifter 234 inversely shifts the DC level of the image data in step S164. Then, the baseband data generating process is put to an end. Control returns to step S124 shown in FIG. 16, and then the partial decoding process is put to an end. Thereafter, control returns to step S101 shown in FIG. 15, and goes to step S102.

Figure 19:
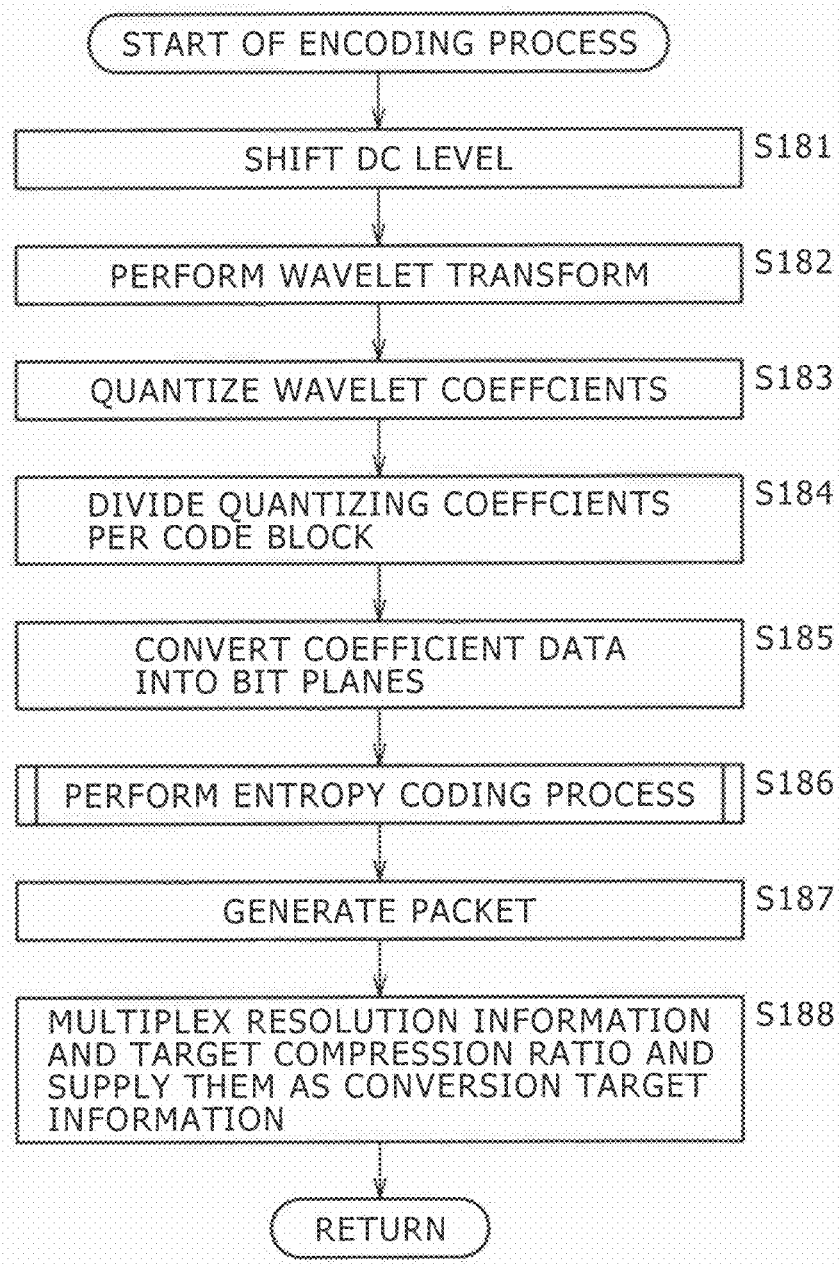
FIG. 19 is a flowchart of an example of an encoding process.

The encoding process which is carried out by the encoder 102 in step S102 shown in FIG. 15 will be described in detail below with reference to a flowchart shown in FIG. 19.

When the encoding process is started, the DC level shifter 151 shifts the DC level of the input image data in step S181. The wavelet transformer 152 then wavelet-transforms the image data in step S182. The quantizer 153 quantizes the wavelet coefficients in step S183. The code blocker 154 divides the wavelet coefficients into code blocks in step S184. The bit plane converter 155 converts the coefficient data in the code blocks into bit planes in step S185. The EBCOT unit 156 and the controller 122 entropy-code each of the bit planes in the order of importance in step S186. Details of the entropy coding process will be described later. The header generator 157 and the packet generator 158 generate packets from the codes produced by the entropy coding process in step S187. In step S188, the supply 123, which includes the resolution information supply 181, the target compression ratio supply 182, and the multiplexer 183, multiplexes the resolution information and the target compression ratio, and supplies them as the transform target information to the partial decoder 101. Then, the encoding process is put to an end. Control then returns to step S102 shown in FIG. 15, and the transcoding process is put to an end.

Figure 20:
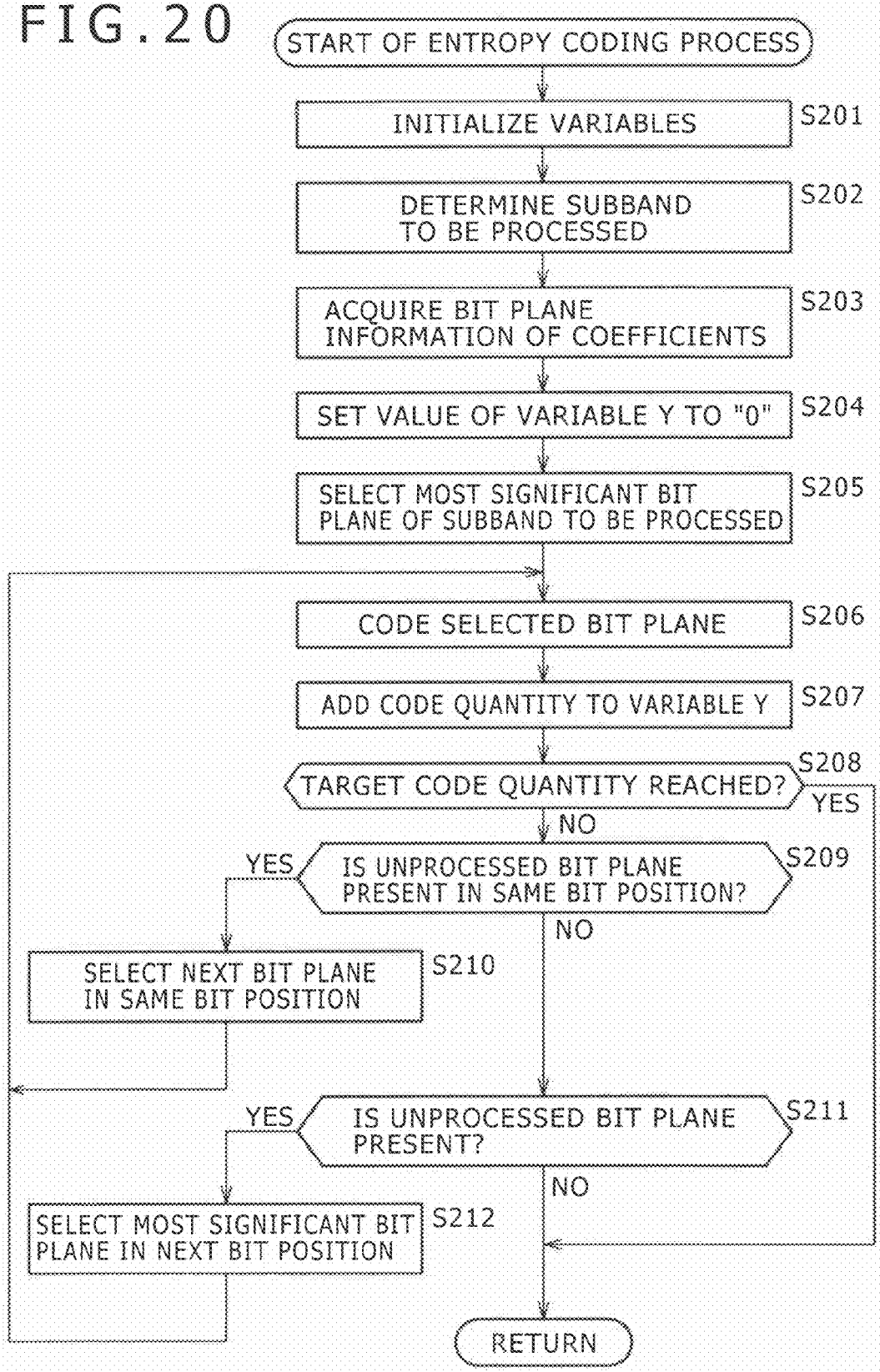
FIG. 20 is a flowchart of an example of an entropy coding process.

The entropy coding process which is carried out in step S186 shown in FIG. 19 will be described in detail below with reference to a flowchart shown in FIG. 20.

When the entropy coding process is started, the controller 171 initializes variables in step S201. The variables include, for example, components $N_C = \{1, 2, \ldots, L_C\}$ to be coded, subbands $N_S = \{1, 2, \ldots, L_S\}$, code blocks B, bit planes C, the numbers of codes T (B, C, $N_C$, $N_S$), and the accumulated number of codes Y.

In step S202, based on the specified resolution input from the input unit 103, the controller 171 determines subbands required to produce image data having the specified resolution as subbands to be processed. If the partial decoder 101 has appropriately selected subbands as described above, then the selection of subbands by the controller 171 may be dispensed with.

The EBCOT unit 156 acquires bit plane information (including zero bit plane information) of coefficients in step S203. The controller 171 sets the value of the variable Y to "0" in step S204. In step S205, the EBCOT unit 156 selects the most important bit plane among the subbands to be processed which are determined in step S202.

Then, the EBCOT unit 156 codes the selected bit plane in step S206. In step S207, the code quantity adder 172 calculates the numbers of codes T (B, C, $N_C$, $N_S$) and adds the calculated numbers of codes T (B, C, $N_C$, $N_S$) to the variable Y according to the following equation:

$$Y = Y + T(B, C, N_C, N_S)$$

The controller 171 refers to the variable Y and determines whether the accumulated value of the numbers of codes has reached the target code quantity or not in step S208. If it is determined that the value (accumulated value) of the variable Y has not reached the target code quantity, then control goes to step S209.

In step S209, the EBCOT unit 156 determines whether an unprocessed bit plane is present in the same bit position or not. If it is determined that an unprocessed bit plane is present in the same bit position, then control goes to step S210 in which a next important bit plane in the same bit position is selected. When the bit plane is selected, control returns to step S206 to repeat the processing from step S206.

If it is determined that an unprocessed bit plane is not present in the same bit position in step S209, then control goes to step S211. In step S211, the EBCOT unit 156 determines whether an unprocessed bit plane is present or not. If it is determined that an unprocessed bit plane is present, then control goes to step S212. In step S212, the EBCOT unit 156 selects the most important bit plane in a next bit position. Then, control returns to step S206 to repeat the processing from step S206.

If it is determined that the value (accumulated value) of the variable Y has reached the target code quantity, then the controller 171 finishes the entropy coding process. Control then returns to step S186 shown in FIG. 19, and goes to step S187. If it is determined that an unprocessed bit plane is not present in step S211, then the EBCOT unit 156 finishes the entropy coding process. Control then returns to step S186 shown in FIG. 19, and goes to step S187.

FIG. 21 shows a table illustrative of the results of an experiment conducted on actual image data according to the above transcoding process. In the experiment, the transcoder 100 transcoded a lossless code stream compressed according to JPEG 2000 into a lossy code stream having a different bit rate according to JPEG 2000. The experiment was conducted under the following conditions:

Original image data: 4,096×2,160 pixels×10 bits×3 (RGB)×24 fps=6370 Mbps

Test sequence: Movie

Lossless compression result (JPEG lossless mode): 3469 Mbps (about 54% of original image data)

Decoded image: Image produced when the lossy encoded code stream shown in FIG. 1 was decoded by an ordinary JPEG 2000 lossy decoder Bit rate of the lossy encoded code stream: 250 Mbps The table shown in FIG. 21 shows the relationship between bit rates and PSNR (Peak Signal-to-Noise Ratio) [dB] in the partial decoding process.

As shown in FIG. 21, as the bit rate of the partial decoding process gradually decreases from the lossless bit rate (3469 Mbps), the number of CPU clock cycles per instruction also decreases. Therefore, as the bit rate of the partial decoding process is lowered, the burden imposed by the partial decoding process is also lowered.

When the bit rate of the partial decoding process is lowered, however, the PSNR of the decoded image data of a lossy encoded file is lowered, i.e., the image quality of the decoded image data of a lossy encoded file is lowered.

The PSNR of the decoded image data of a lossy encoded file at the time the bit rate of the partial decoding process is the same as the lossless bit rate (3469 Mbps) is 37.38, and the PSNR of the decoded image data of a lossy encoded file at the time the bit rate of the partial decoding process is the same as the bit rate (250 Mbps) of the subsequent lossy encoding process is 36.89. Therefore, the difference between these PSNRs is very small (37.37−36.89=0.49 [dB]). On the other hand, the number of CPU clock cycles per instruction for the bit rate of 3469 Mbps is 7,105, and the number of CPU clock cycles per instruction for the bit rate of 250 Mbps is 771. Therefore, the latter number of CPU clock cycles per instruction is reduced to about one-tenth of the former number of CPU clock cycles per instruction (771/7105=0.108). The number of CPU clock cycles per instruction for the subsequent lossy encoding process remains unchanged but is of a constant value of 904.

The partial decoder 101 is thus capable of reducing the burden imposed for decoding a lossless compression file while reducing a reduction in the image quality. Stated otherwise, the transcoder 100 can easily and appropriately convert a lossless compression file into a lossy compression file even when master image data have a large data size.

When the partial decoder 101 selects subbands to be wavelet-inverse-transformed depending on the required resolution, the amount of image data to be wavelet-inverse-transformed is reduced. Therefore, the experimental results shown in FIG. 21 indicate that the burden imposed for decoding a lossless compression file is further reduced.

Figure 22:
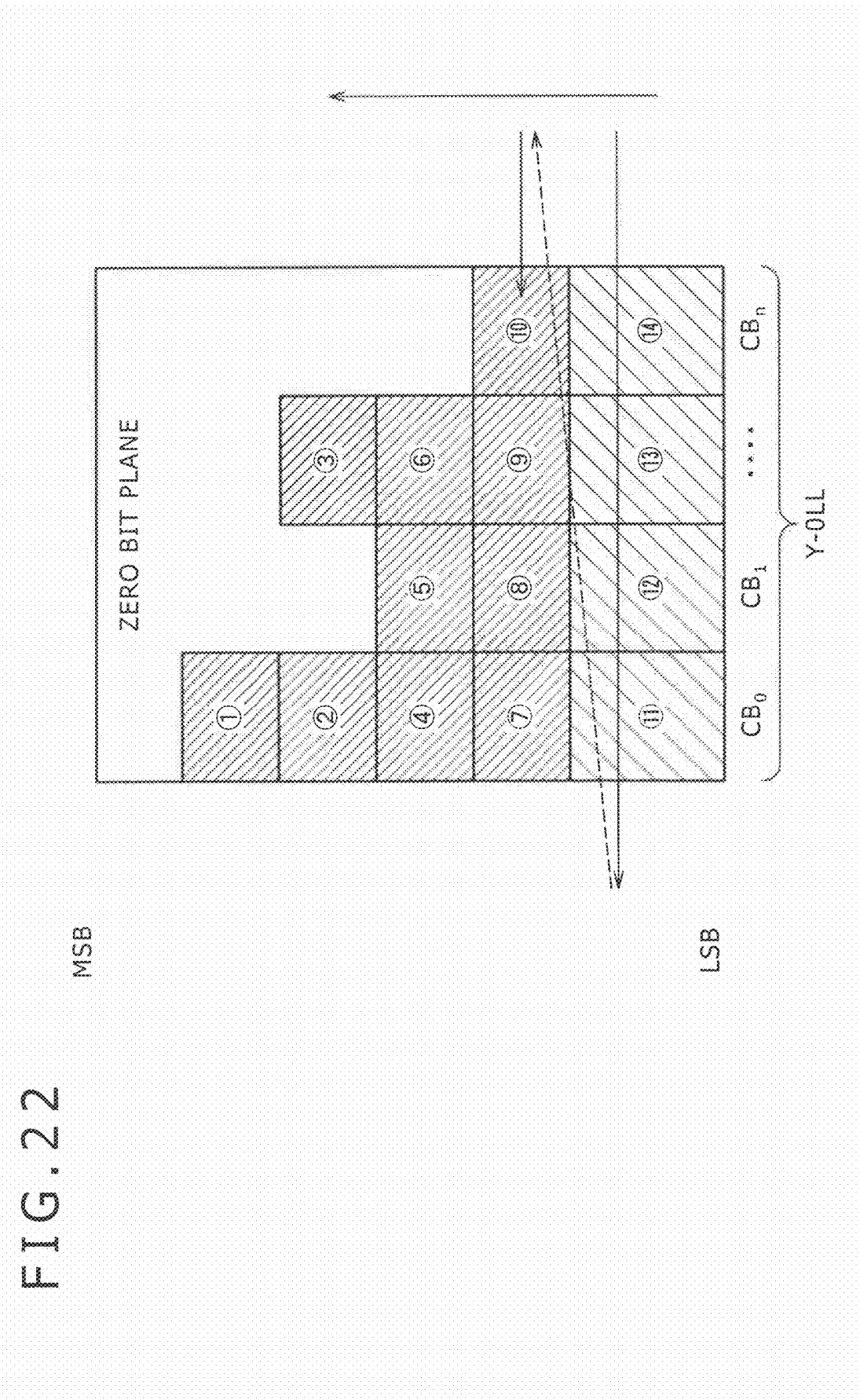
FIG. 22 is a diagram showing an example of a scanning sequence for selecting bit planes to be truncated.

The partial decoder 101 has been described as selecting bit planes for use in decoded image data. However, since the data size of the master image data is known, the partial decoder 101 may select bit planes to be truncated, i.e., bit planes other than selected bit planes, as shown in FIG. 22. For selecting bit planes to be truncated, the partial decoder 101 selects bit planes to be truncated in the ascending order of importance (hereinafter referred to as truncated bit planes).

FIG. 22 is a diagram showing an example of a scanning sequence for selecting bit planes to be truncated. In FIG. 22, bit planes are selected in the directions indicated by the arrows. Specifically, truncated bit planes are selected in the sequence from LSB to MSB. First, the bit plane (14) is selected, and then the bit plane (13) is selected. After all the bit planes at LSB are selected, the least important bit plane at a next bit position higher than LSB, i.e., the bit plane (10), is selected. Subsequently, the remaining bit planes are similarly scanned in the same manner as described above.

The partial decoder 101 adds the numbers of codes of truncated bit planes thus selected, and subtracts the sum of the numbers of codes of truncated bit planes from the data size of the master image data, thereby calculating the number of codes of bit planes not truncated, i.e., the number of codes of selected bit planes, and hence the compression ratio of the selected bit planes with respect to the master image data. Accordingly, the partial decoder 101 can control the amount of data in the same manner as when selected bit planes are selected.

Figure 23:
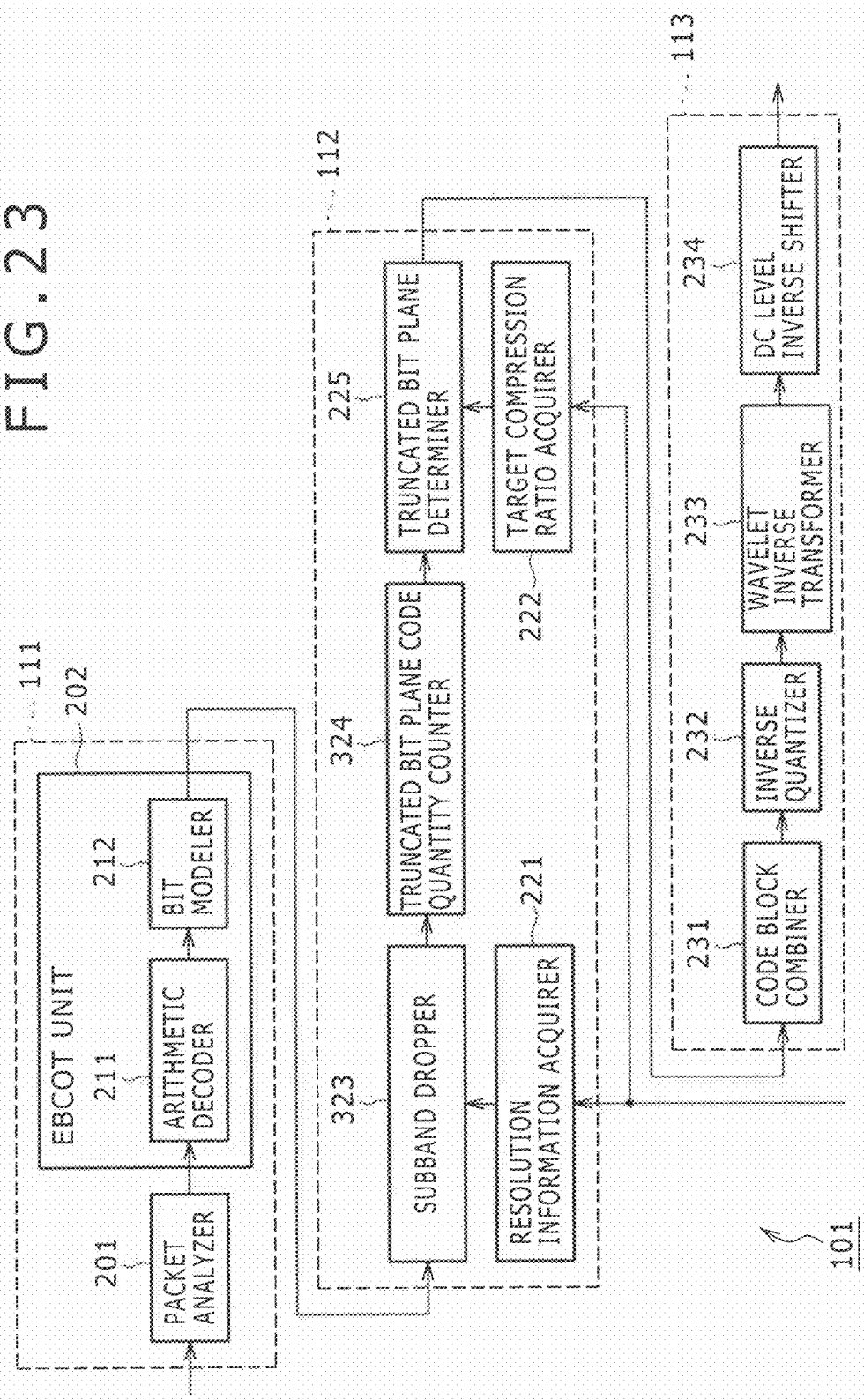
FIG. 23 is a block diagram showing another detailed configurational example of the partial decoder.

FIG. 23 shows in block form another detailed configurational example of the partial decoder 101 for selecting bit planes to be truncated. FIG. 23 corresponds to FIG. 10. The partial decoder 101 shown in FIG. 23 is different from the partial decoder 101 shown in FIG. 10 in that the extractor 112 includes a subband dropper 323 instead of the subband selector 223, a truncated bit plane code quantity counter 324 instead of the selected bit plane code quantity counter 224, and a truncated bit plane determiner 325 instead of the selected bit plane determiner 225. Other details of the partial decoder 101 shown in FIG. 23 are identical to those of the partial decoder 101 shown in FIG. 10, and will not be described in detail below.

The subband dropper 323 drops subbands not required to achieve the resolution specified by the resolution information acquired from the resolution information acquirer 221, and supplies the remaining subbands to the truncated bit plane code quantity counter 324.

The truncated bit plane code quantity counter 324 accumulates the bit planes of the subbands which have not been dropped by the subband dropper 323, selects one at a time of the bit planes as candidates for truncated bit planes in the ascending order of importance, counts the number of codes of each selected candidate for a truncated bit plane, and supplies the count to the truncated bit plane determiner 325.

The truncated bit plane determiner 325 calculates a compression ratio of bit planes not to be truncated, i.e., selected bit planes, with respect to the master image data, based on the number of counts of the candidates for truncated bit planes supplied from the truncated bit plane code quantity counter 324. The truncated bit plane determiner 325 then compares the calculated compression ratio with the target compression ratio acquired by the target compression ratio acquirer 222. If the two equations shown below are satisfied, then the truncated bit plane determiner 325 determines the candidates for truncated bit planes as truncated bit planes, truncates them, and supplies the remaining bit planes as selected bit planes to the subsequent processing stage.

(Target compression ratio)≧(Data size of master image data)/(The number of lossless compression codes−the sum of the numbers of codes of the bit planes (14) through (11))

(Target compression ratio)≦(Data size of master image data)/(The number of lossless compression codes−the sum of the numbers of codes of the bit planes (14) through (10))

The above two equations indicate that when truncated bit planes are selected from the bit plane (14) up to the bit plane (10), the compression ratio of bit planes not to be truncated, i.e., selected bit planes, has become equal to or greater than the target compression ratio.

The truncated bit plane determiner 325 supplies the remaining bit planes as selected bit planes to the code block combiner 231.

Figure 24:
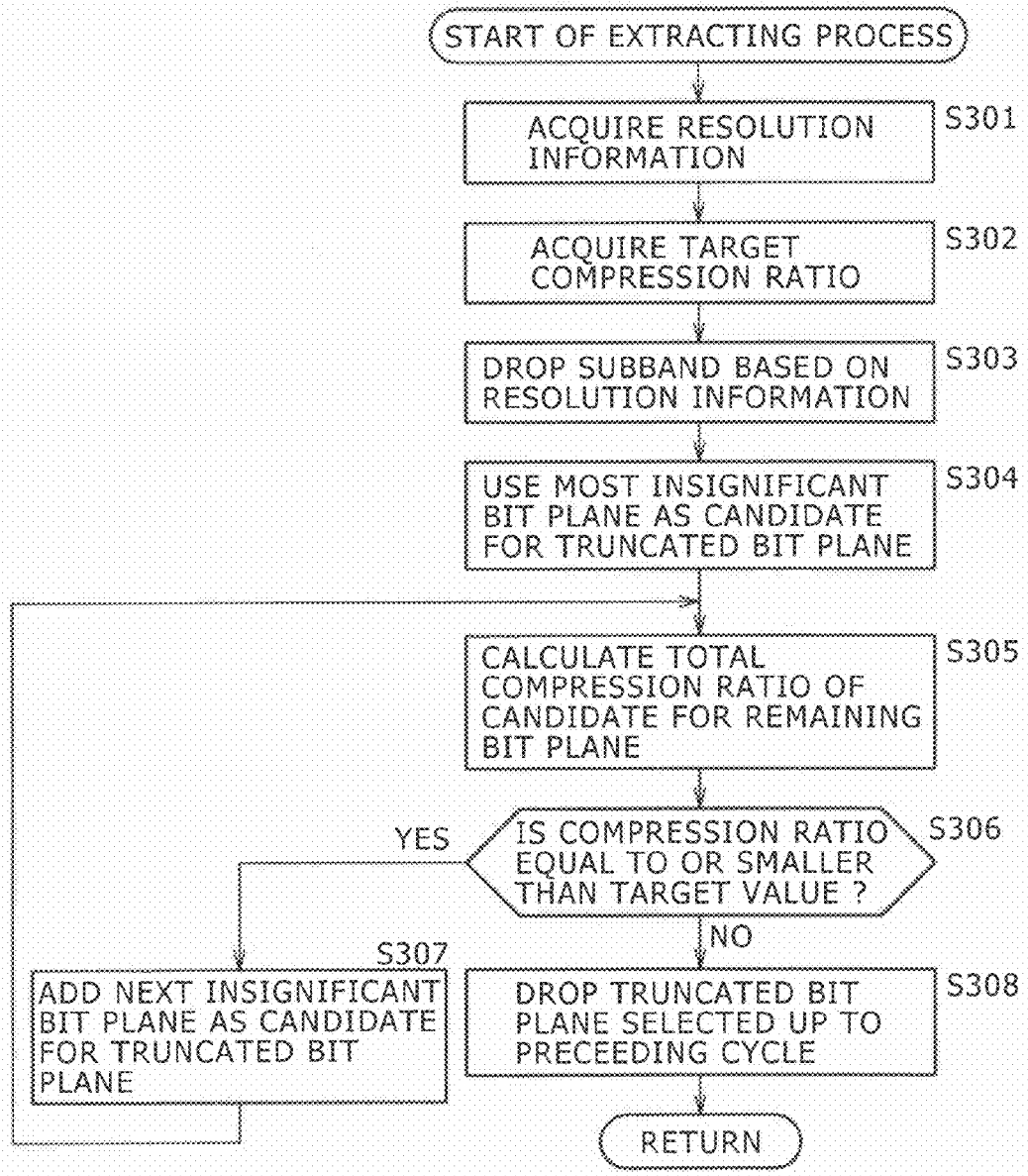
FIG. 24 is a flowchart of another example of the extracting process.

An extracting process which is carried out by the extractor 112 for extracting truncated bit planes will be described in detail below with reference to a flowchart shown in FIG. 24. The extracting process shown in FIG. 24 is similar to the extracting process shown in FIG. 17, except as follows:

When the extracting process is started, the resolution information acquirer 221 acquires resolution information from the transform target information in step S301. The target compression ratio acquirer 222 acquires a target compression ratio from the transform target information in step 302. Based on the resolution information acquired in step S301, the subband dropper 323 drops subbands not required to generate image data having a resolution which is specified by the acquired resolution information.

The truncated bit plane code quantity counter 324 holds the coefficients (bit planes) of the subbands which have not been dropped, selects the least important bit plane among the bit planes held thereby, as a candidate for a truncated bit plane, and calculates the number of codes thereof in step S304. In step S305, the truncated bit plane determiner 325 calculates a compression ratio of the remaining bit planes at the time with respect to master image data, i.e., original image data, based on the number of codes counted by the truncated bit plane code quantity counter 324. The truncated bit plane determiner 325 then determines, in step S306, whether or not the calculated compression ratio is equal to or smaller than the target compression ratio acquired in step S302.

If it is determined that the compression ratio of the remaining bit planes is equal to or smaller than the target compression ratio, i.e., if the number of codes of the remaining bit planes is too large, then control goes to step S307. In step S307, the truncated bit plane code quantity counter 324 selects a next less important bit plane among the bit planes held thereby, i.e., the least important bit plane among the remaining bit planes, as a candidate for a truncated bit plane, and calculates the number of codes thereof. Control then goes back to step S305 to repeat the processing from step S305. In other words, until the calculated compression ratio of the remaining bit planes becomes greater than the target compression ratio, the truncated bit plane code quantity counter 324 and the truncated bit plane determiner 325 repeatedly execute steps S305, S306, S307 to increase the number of counts of the candidate for the selected bit plane.

If it is determined in step S306 that the calculated compression ratio of the remaining bit planes is greater than the target compression ratio, then control goes to step S308 in which the truncated bit plane determiner 325 drops the truncated bit planes selected up to the preceding cycle, and supplies the remaining bit planes as selected bit planes to the code block combiner 231. Then, the extracting process is put to an end. Control returns to step S123 shown in FIG. 6, and goes to step S124.

The extractor 112 performs the extracting process as described above to drop unnecessary bit planes to extract coefficient data in order to satisfy the conditions data of the resolution and the compression ratio specified by the transform target information.

The partial decoder 101 has been described as performing the partial decoding process based on the compression ratio of the code stream and the resolution of the image data which are included in the transform target information. However, the partial decoder 101 may perform the partial decoding process based on only the compression ratio of the code stream included in the transform target information. In such a case, the partial decoder 101 shown in FIG. 10 may be devoid of the resolution information acquirer 221 and the subband selector 223, and steps S141, S143 of the extracting process shown in FIG. 17 may be dispensed with.

Alternatively, the partial decoder 101 may perform the partial decoding process based on only the resolution of the image data included in the transform target information. In such a case, the partial decoder 101 shown in FIG. 10 may be devoid of the target compression ratio acquirer 222, the selected bit plane code quantity counter 224, and the selected bit plane determiner 225, and steps S142, S144 through S148 of the extracting process shown in FIG. 17 may be dispensed with.

The partial decoder 101 may perform the partial decoding process based on other parameters than those described above. For example, the transcoder 100 may convert the format of a color space (color format) of image data of a code stream, and the partial decoder 101 may perform the partial decoding process based on the information of a color format which is included in the transform target information. Such a modification will be described below.

First, a color format will be described below. If a YCbCr format is used as representing the color space of image data, then the ratio of the amounts of information of a Y component as a luminance component and Cb and Cr components as color difference components, or the ratio of sampling frequencies, can be set to any of various sets, e.g., 4:4:4, 4:2:2, or 4:2:0.

Figure 25A:
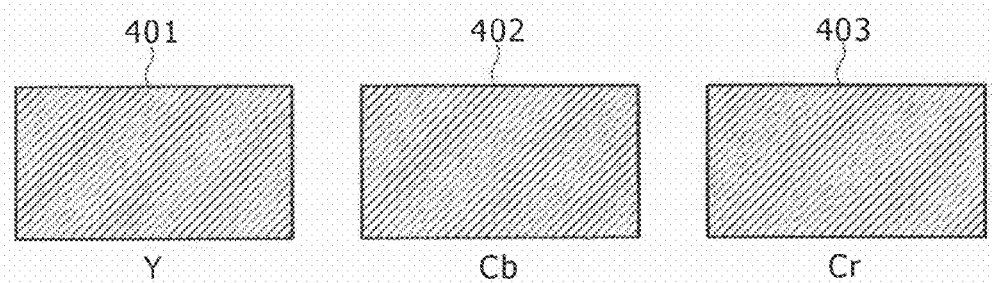
FIGS. 25A to 25C are diagrams showing an example of color formats.

According to the 4:4:4 format, the amounts of information of the Y, Cb, and Cr components are equal to each other, and the resolutions of these components are equal to each other. For example, FIG. 25A shows a Y component 401, a Cb component 402, and a Cr component 403 which are equal to each other.

Figure 25B:
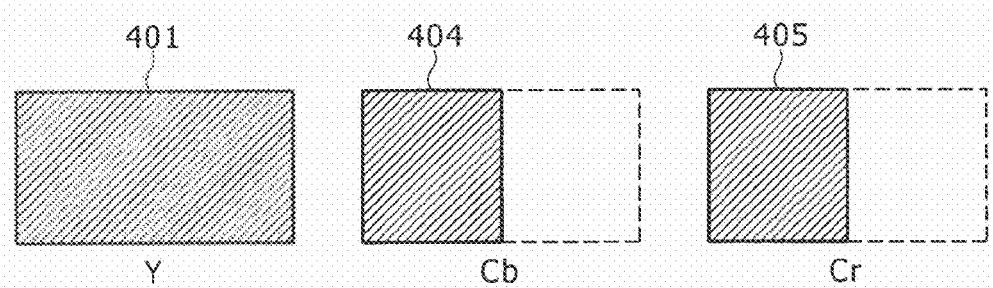

According to the 4:2:2 format, the amounts of information of the Cb and Cr components are one-half of the amount of information of the Y component. For example, FIG. 25B shows a Y component 401, a Cb component 404, and a Cr component 405. The Cb component 404 and the Cr component 405 have a horizontal resolution which is one-half of the horizontal resolution of the Y component 401.

Figure 25C:
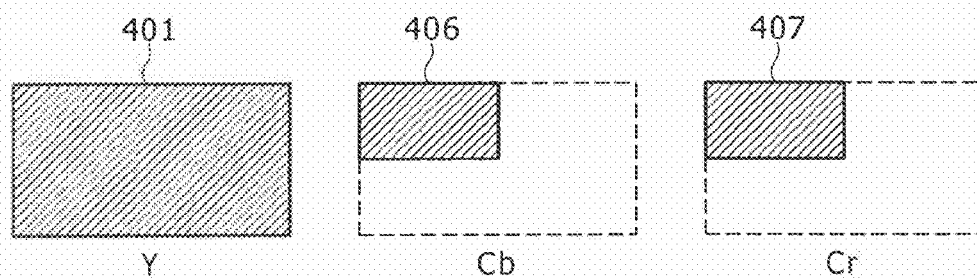

According to the 4:2:0 format, the amounts of information of the Cb and Cr components are one-quarter of the amount of information of the Y component. For example, FIG. 25C shows a Y component 401, a Cb component 406, and a Cr component 407. The Cb component 406 and the Cr component 407 have horizontal and vertical resolutions which are one-half of the horizontal and vertical resolutions of the Y component 401.

Conversion between such color formats will be described below. For converting a code stream according to the 4:4:4 format into a code stream according to the 4:2:0 format, the partial decoder 101 may generate baseband image data according to the 4:2:0 format. Specifically, when the partial decoder 101 performs its decoding process, the partial decoder 101 selects subbands of the Cb and Cr components at a lower frequency in both vertical and horizontal directions at a level which is one level lower than the Y component. Actually, each of the subbands at a lower frequency in both vertical and horizontal directions is divided into a plurality of subbands by the recursive wavelet transform process. The partial decoder 101 selects all those subbands.

For converting a code stream according to the 4:4:4 format into a code stream according to the 4:2:2 format, the partial decoder 101 may generate baseband image data according to the 4:2:2 format. According to the 4:2:2 format, only the horizontal resolution of the Cb component and the Cr component is one-half of the horizontal resolution of the Y component. When the partial decoder 101 performs its decoding process, the partial decoder 101 selects two subbands of the Cb and Cr components at a lower frequency in a horizontal direction, among four subbands at a level which is one level lower than the Y component. Actually, any of the two subbands at the lower frequency in the horizontal direction, which is at a lower frequency in both vertical and horizontal directions, is divided into a plurality of subbands by the recursive wavelet transform process. The partial decoder 101 selects all those subbands as subbands at a lower frequency in both vertical and horizontal directions.

The partial decoder 101 then wavelet-inverse-transforms two subbands in only the vertical direction for a highest level of color difference components to generate baseband color difference components, such as the Cb component 404 and the Cr component 405 shown in FIG. 25B, whose horizontal resolution is reduce to one-half of the Y component 401.

A wavelet transforming process for color difference components according to the 4:2:2 format may be carried out in the same manner as with luminance components. Rather, a wavelet transforming process may be performed on color difference components at a highest level in only the vertical direction, and then on color difference components at a lower frequency at successive lower levels in the same manner as with luminance components. The latter alternative will be described below.

For converting a code stream according to the 4:2:2 format into a code stream according to the 4:2:0 format, the partial decoder 101 may generate baseband image data according to the 4:2:0 format. When the partial decoder 101 performs its decoding process, the partial decoder 101 selects a subband of the Cb and Cr components at a lower frequency at a level which is one level lower than the Y component, i.e., one of two subbands which is at a lower frequency in the vertical direction. Actually, the subband at the lower frequency is further divided into a plurality of subbands by the recursive wavelet transform process. The partial decoder 101 selects all those subbands.

Configurational examples of the partial decoder 101 and the encoder 102 for conversion between color formats will be described below. FIG. 26 shows in block form a configurational example of the partial decoder 101. The partial decoder 101 shown in FIG. 26 is similar to the partial decoder 101 shown in FIG. 10, except as follows.

As shown in FIG. 26, the extractor 112 of the partial decoder 101 includes a color information acquirer 420 in addition to the elements shown in FIG. 10. The color information acquirer 420 acquires color information specifying the color format of image data of a converted code stream from the transform target information supplied from the encoder 102. The color information acquirer 420 supplies the acquired color information together with the transform target information to the resolution information acquirer 221. When the resolution information acquirer 221 acquires resolution information from the transform target information, the resolution information acquirer 221 supplies the resolution information together with the color information to the subband selector 223. Based on the color information and the resolution information, the subband selector 223 selects subbands to be processed, and supplies the selected subbands to the selected bit plane code quantity counter 224.

Since the subband selector 223 selects subbands based on the color information and the resolution information, the extractor 112 can appropriately extracts subbands required to generate a code stream of image data having a target resolution and color format. With subbands being thus extracted, the baseband generator 113 can minimize an unwanted increase in the burden of its baseband generating process.

As shown in FIG. 26, the baseband generator 113 of the partial decoder 101 includes a color information acquirer 430 and a controller 431 in addition to the elements shown in FIG. 10. The color information acquirer 430 acquires color information from the transform target information, and supplies the acquired color information to the controller 431 as with the color information acquirer 420. Based on the supplied color information, the controller 431 controls the wavelet inverse transformer 233 to appropriately wavelet-inverse-transform the color difference components in any color format specified by the color information.

For example, if the color format specified by the color information is a 4:2:2 format, then the controller 431 controls the wavelet inverse transformer 233 to wavelet-inverse-transform color difference components at a highest level (final level) in only the vertical direction, using two subbands which are present at the time. In this manner, the baseband generator 113 can generate color difference components, such as the Cb component 404 and the Cr component 405 shown in FIG. 25B, of baseband image data whose resolution is one-half of the resolution of the luminance component in only the horizontal direction.

Figure 27:
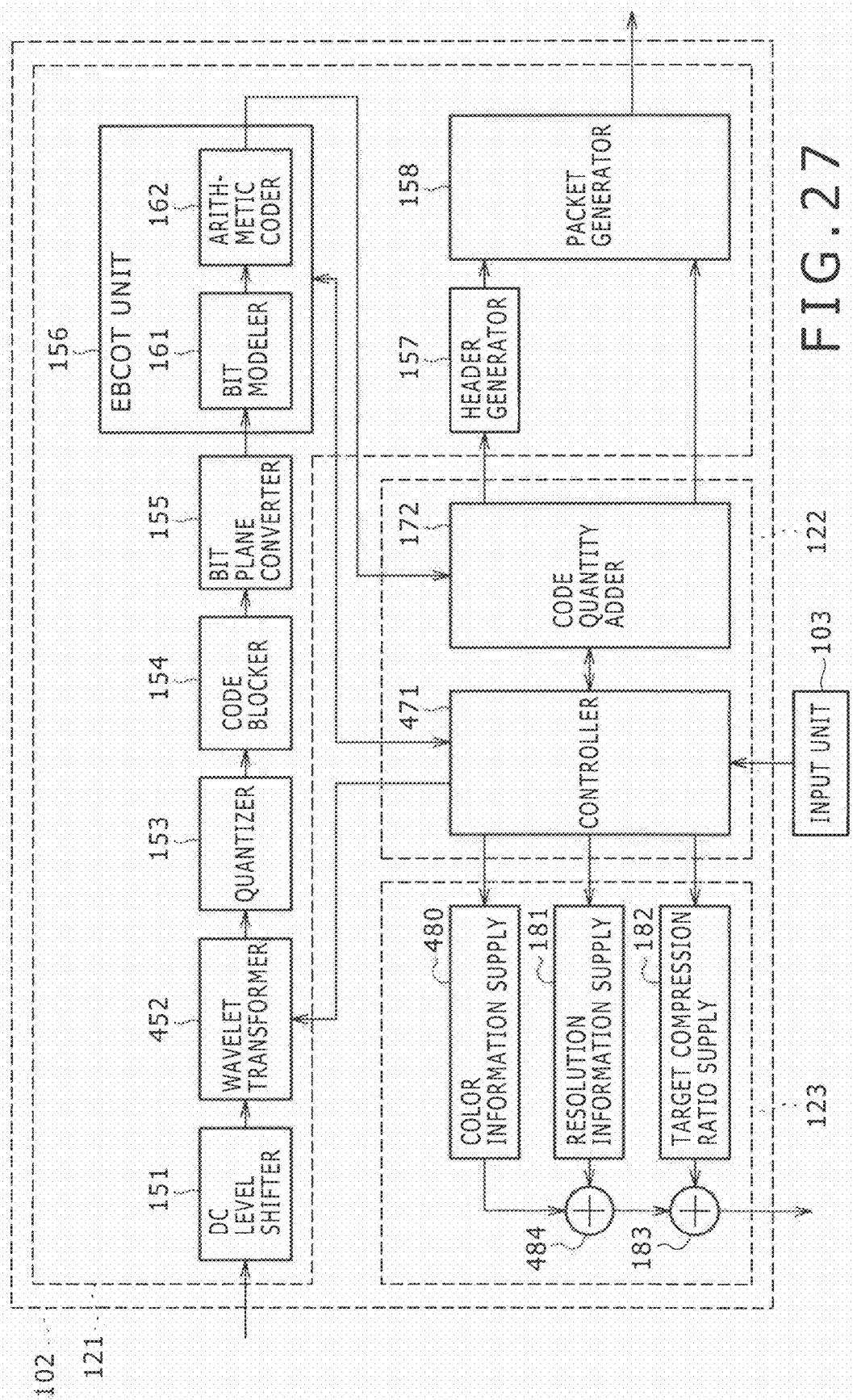
FIG. 27 is a block diagram showing another detailed configurational example of the encoder.

FIG. 27 shows in block form a configurational example of the encoder 102. The encoder 102 shown in FIG. 27 is similar to the encoder 102 shown in FIG. 2, except as follows:

As shown in FIG. 27, the code stream generator 121 of the encoder 102 includes a wavelet transformer 452 instead of the wavelet transformer 152, and the controller 122 of the encoder 102 includes a controller 471 instead of the controller 171. The controller 471 performs the same control process as with the controller 171, and in addition controls the wavelet transformer 452 based on the color information specifying the color format of image data of a converted code stream, which is input through the input unit 103. The wavelet transformer 452 is controlled by the controller 471 to wavelet-transform the color difference components in any color format. For example, if the color format specified by the color information is a 4:2:2 format, then the wavelet transformer 452 wavelet-transforms color difference components at a highest level (first level) in only the vertical direction.

The controller 471 supplies the color information to the supply 123. As shown in FIG. 27, the supply 123 includes a color information supply 480 and a multiplexer 484 in addition to the elements shown in FIG. 2.

The color information supply 480 supplies the color information from the controller 471 to the multiplexer 484 for the purpose of supplying same to the partial decoder 101. The multiplexer 484 multiplexes the supplied color information and the resolution information supplied from the resolution information supply 181, and supplies them to the multiplexer 183. The multiplexer 183 multiplexes the resolution information which has been multiplexed with the color information and the target compression ratio supplied from the target compression ratio supply 182, and supplies them to the partial decoder 101.

As described above, the color information is multiplexed with the resolution information and the target compression ratio, and they are supplied as transform target information to the extractor 112 of the partial decoder 101. Alternatively, the color information, the resolution information, and the target compression ratio may not be multiplexed, but may be supplied individually to the extractor 112 of the partial decoder 101.

Processes performed by the partial decoder 101 shown in FIG. 26 and the encoder 102 shown in FIG. 27 will be described below. These processes are basically the same as the processes described above. However, the extracting process and the baseband data generating process of the partial decoding process, and a portion of the encoding process are different from the processes described above.

Figure 28:
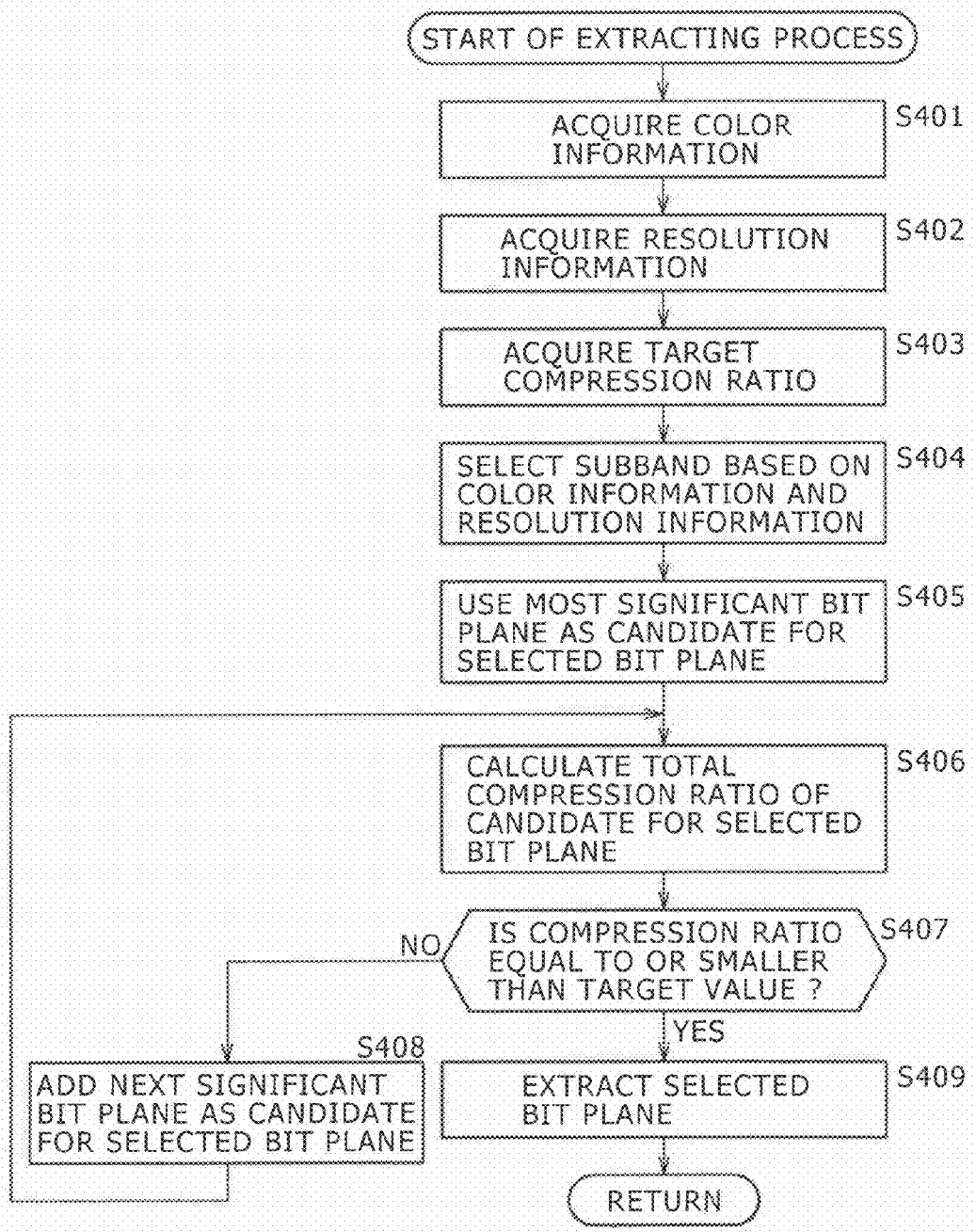
FIG. 28 is a flowchart of still another example of the extracting process.

The extracting process will be described below with reference to a flowchart shown in FIG. 28. The extracting process shown in FIG. 28 is similar to the extracting process shown in FIG. 17, except as follows.

When the extracting process is started, the recolor information acquirer 420 acquires color information from the transform target information in step S401. Steps S402, S403 are identical to steps S141, S142 shown in FIG. 17. Based on the color information and the resolution information, the subband selector 223 selects subbands to be processed in step S404. Specifically, the subband selector 223 not only narrows down subbands based on the resolution, but also narrows down subbands of color difference components to drop those subbands which are unnecessary due to the conversion of the color format. Steps S405 through S409 are identical to steps S144 through S148 shown in FIG. 17.

Figure 29:
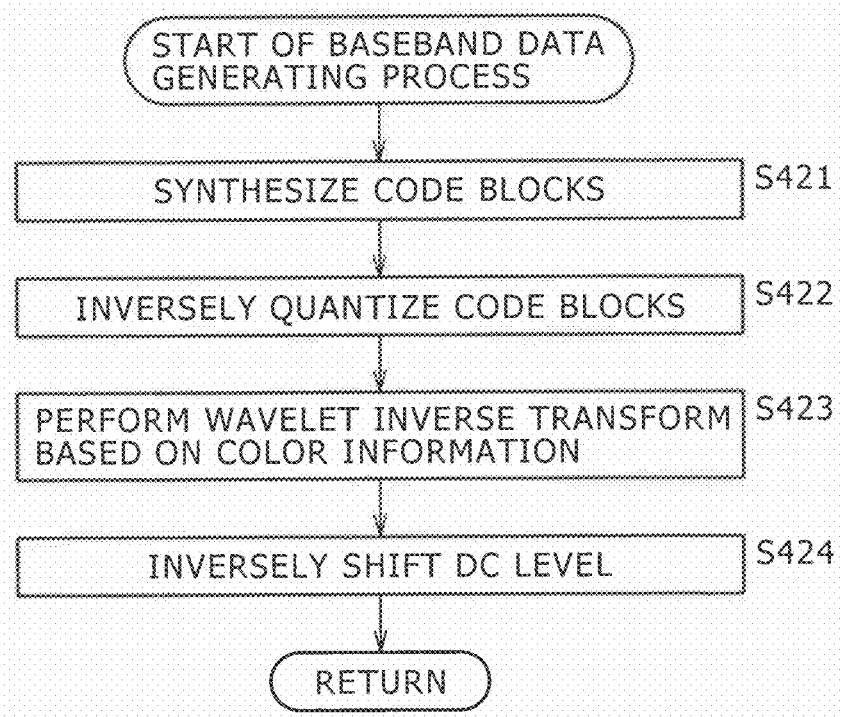
FIG. 29 is a flowchart of another example of the baseband data generating process.

The baseband data generating process will be described below with reference to a flowchart shown in FIG. 29. The baseband data generating process shown in FIG. 29 is similar to the baseband data generating process shown in FIG. 18, except as follows.

When baseband data generating process is started, the code block combiner 231 combines code blocks in step S421 as with step S161. The inverse quantizer 232 inversely quantizes the combined code blocks in step S422 as with step S162. The wavelet inverse transformer 233 is controlled by the controller 431 to wavelet-inverse-transform the coefficient data which are inversely quantized based on the color information in step S423. The DC level inverse shifter 234 inversely shifts the DC level of the image data in step S424 as with step S164. Then, the baseband data generating process is put to an end.

According to the extracting process and the baseband data generating process described above, the partial decoder 101 can appropriately reduce the burden of the transcoding process for transcoding color formats.

The encoding process will be described below with reference to a flowchart shown in FIG. 30. The encoding process shown in FIG. 30 is similar to the encoding process shown in FIG. 19, except as follows.

When the encoding process is started, the DC level shifter 151 shifts the DC level of the input image data in step S441 as with step S181. The wavelet transformer 452 then appropriately wavelet-transforms the image data depending on the converted color format based on the color information in step S442. Steps S443 through S447 are identical to steps S183 through S187 shown in FIG. 19. In step S448, the supply 123, which includes the color information supply 480, the resolution information supply 181, the target compression ratio supply 182, the multiplexer 484, and the multiplexer 183, multiplexes the color information, the resolution information, and the target compression ratio, and supplies them as the transform target information to the partial decoder 101. Then, the encoding process is put to an end.

According to the above encoding process, the encoder 102 can appropriately code image data depending on the color format thereof.

While the three formats, i.e., the color format, the resolution, and the compression ratio, are converted based on the color information, the resolution information, and the target compression ratio in the above embodiment, only the color format may be converted based on the color information. Alternatively, two formats, i.e., the color format and the resolution, may be converted based on the color information and the resolution information, or the color format and the compression ratio may be converted based on the color information and the target compression ratio.

The transcoder 100 described above is applicable to any of various systems.

Figure 31A:
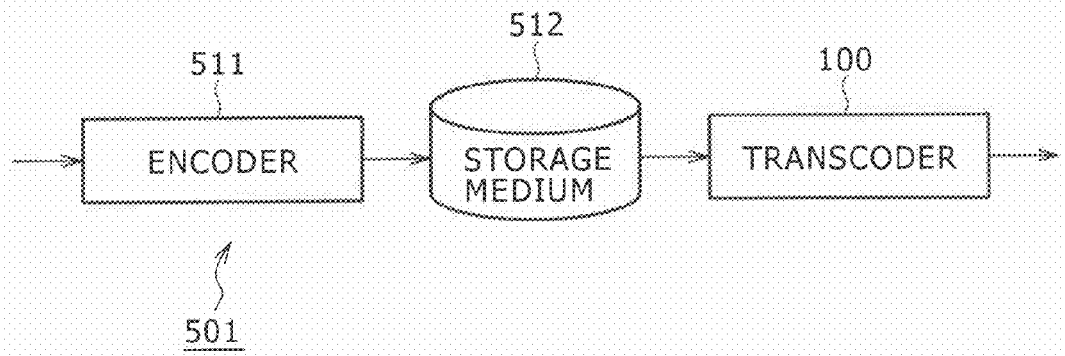
FIGS. 31A to 31C are block diagrams showing configurational examples of coding systems according to an embodiment of the present invention.

For example, a coding system 501 shown in FIG. 31A includes an encoder 511 for coding image data, a storage medium 512 such as a hard disk, an optical disk, or the like for storing the coded image data, and the transcoder 100 for reading, transcoding and outputting the coded data at any desire time. The coding system 501 which incorporates the transcoder 100 is capable of storing coded data of various formats in the storage medium 512 and of providing coded data of various formats without the need for storing baseband image data.

Figure 31B:
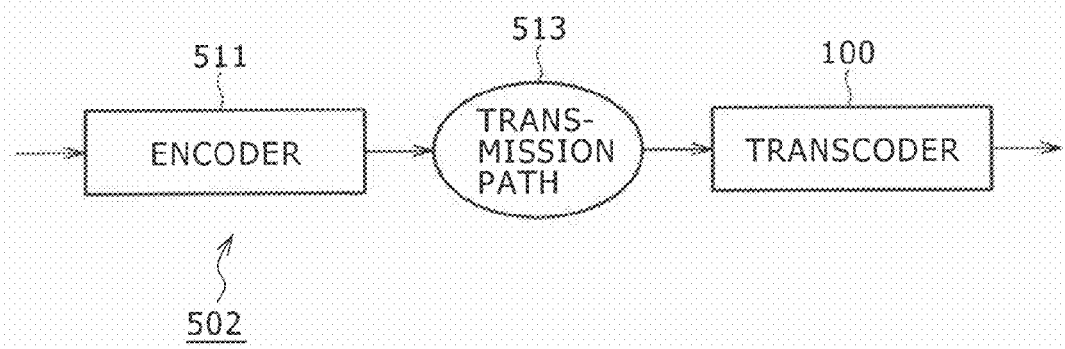

A coding system 511 shown in FIG. 31B includes the encoder 511, a transmission path 513 instead of the storage medium 512 for transmitting the coded image data from the encoder 511, and the transcoder 100 for transcoding the coded image data transmitted through the transmission path 513. The transmission path 513 allows the coded image data to be transmitted successively from the encoder 511 to the transcoder 100, which can thus successively transcode the coded image data into data of various formats.

Figure 31C:
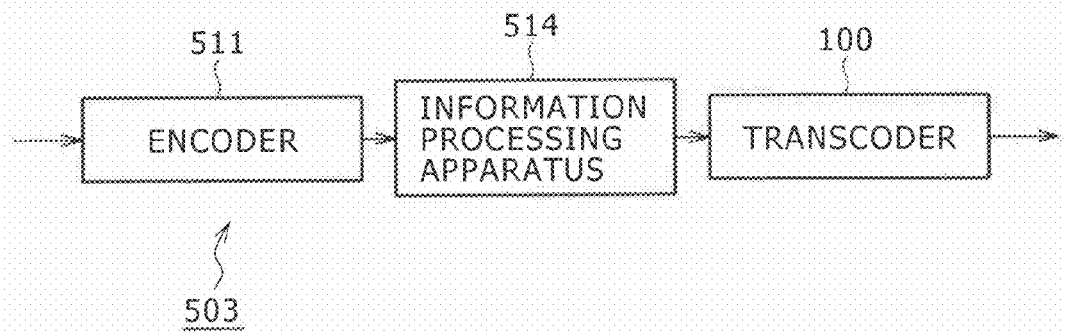

A coding system 503 shown in FIG. 31C includes the encoder 511, an information processing apparatus 514 for processing the coded image data from the encoder 511, and the transcoder 100 for transcoding the coded image data processed by the information processing apparatus 514. The information processing apparatus 514 processes the coded image data from the encoder 511 and supplies the processed image data to the transcoder 100, which can transcode the processed image data into data of various formats.

The transcoder 100 may also be incorporated in systems other than the systems 501, 502, 503 shown in FIGS. 31A, 31B, 31C. The transcoder 100 may be integrally combined with other elements so as to be part of another apparatus. For example, the encoder 511, the storage medium 512, and the transcoder 100 shown in FIG. 31A may be combined into a single apparatus. Similarly, the encoder 511, the transmission path 513, and the transcoder 100 shown in FIG. 31B or the encoder 511, the information processing apparatus 514, and the transcoder 100 shown in FIG. 31C may be combined into a single apparatus.

The processes referred to above may be implemented by software or hardware. If the processes are software-implemented, then they may be provided as functions performed by a personal computer 600 shown in FIG. 32, for example.

Figure 32:
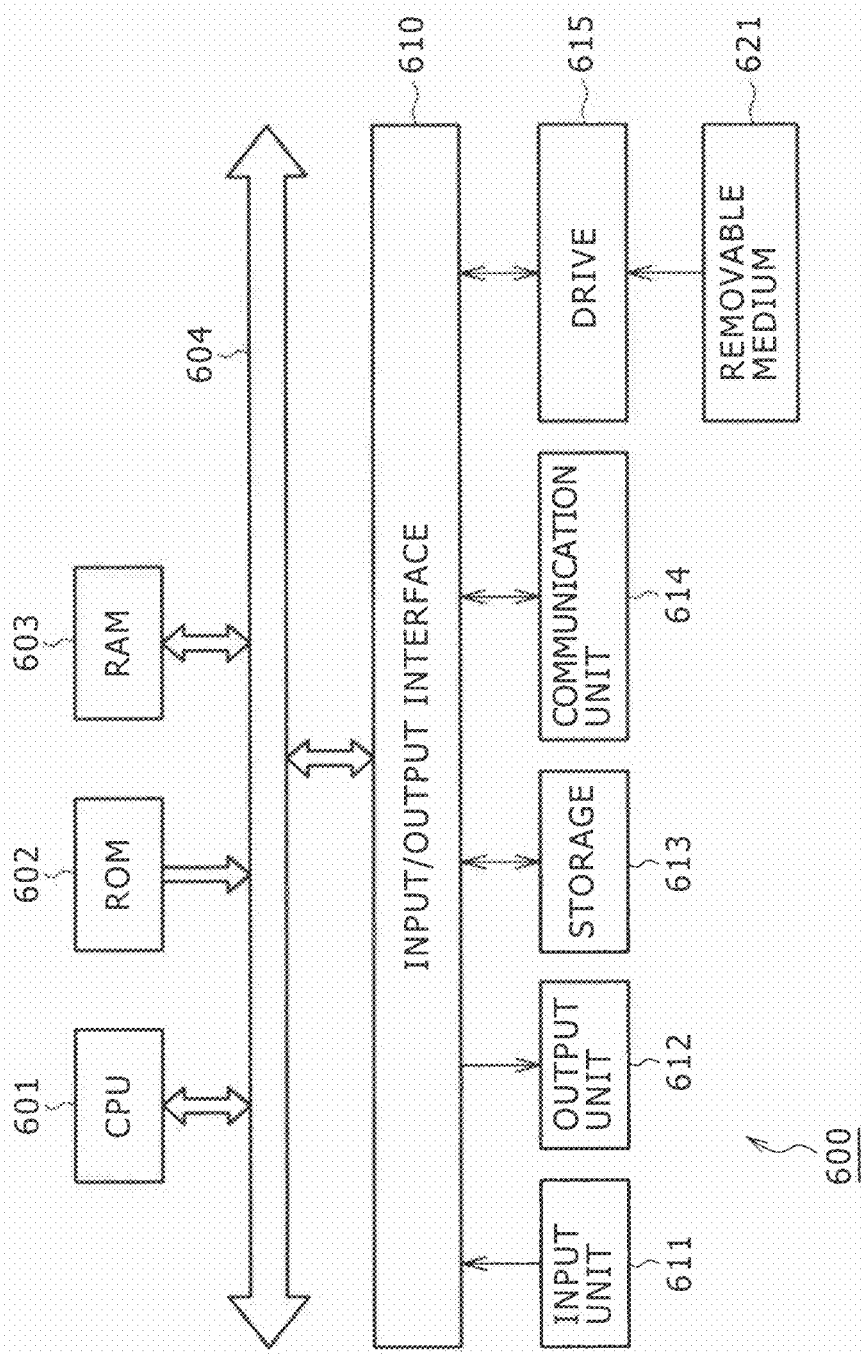
FIG. 32 is a block diagram showing a configurational example of a personal computer according to an embodiment.

In FIG. 32, the personal computer 600 includes a CPU (Central Processing Unit) 601 which carries out various processed according to programs stored in a ROM (Read Only Memory) 602 or programs loaded from a storage 613 into a RAM (Random Access Memory) 603. The RAM 603 also stores various data required for the CPU 601 to execute various processes.

The CPU 601, the ROM 602, and the RAM 603 are connected to each other by a bus 604 that is connected to an input/output interface 610.

To the input/output interface 610, there are connected an input unit 611 including a keyboard, a mouse, etc., an output unit 612 including a display such as a CRT (Cathode Ray Tube), an LCD (Liquid Crystal Display), or the like and speakers, the storage 613 which may be a hard disk or the like, and a communication unit 614 such as a modem or the like. The communication unit 614 communicates with other computers and systems via networks including the Internet.

The input/output interface 610 is also connected to a drive 615 in which a removable medium 621 such as a magnetic disk, an optical disk, a magnetooptical disk, or a semiconductor memory is removably mounted. Computer programs read from the removable medium 621 by the drive 615 are installed in the storage 613.

If the processes described above are software-implemented, then software programs are installed from a network or a recording medium into the storage 613.

The recording medium may be in the form of the removable medium 621 which stores those software programs, such as a magnetic disk including a flexible disk, an optical disk including a CD-ROM (Compact Disc-Read Only Memory) or a DVD (Digital Versatile Disc), a magnetooptical disk including an MD (Mini Disc), and a semiconductor memory. The removable medium 621 is usually distributed to the user for providing programs, separately from the personal computer 600. The recording medium may alternatively be in the form of the ROM 602 with the programs recorded therein or a hard disk included in the storage 613, which is provided to the user in combination with the personal computer 600.

Steps which are descriptive of the programs recorded in the recording medium may be carried out sequentially according to the chronological sequence described above, or may be carried out parallel to each other or individually.

In the present description, the term "system" refers to an entity including a plurality of devices or apparatus.

A unit, a device, an apparatus, or an entity which has been described as a single element may be divided into a plurality of units, devices, apparatus, or entities. Conversely, a plurality of units, devices, apparatus, or entities may be combined into a single unit, device, apparatus, or entity. Configurational details other than described above may be added to a unit, a device, an apparatus, or an entity which has been described.

Some of configurational details of a unit, a device, an apparatus, or an entity may be included in another unit, device, apparatus, or entity insofar as the entire system essentially remains unchanged in configuration and operation.

Although certain preferred embodiments of the present invention have been shown and described in detail, it should be understood that various changes and modifications may be made therein without departing from the scope of the appended claims.

The present application contains subject matter related to that disclosed in Japanese Priority Patent Application JP 2008-151696 filed in the Japan Patent Office on Jun. 10, 2008, the entire content of which is hereby incorporated by reference.

What is claimed is:

1. An information processing apparatus comprising:

partial decoding means for decoding a portion of a first code stream representative of coded image data into baseband image data; and encoding means for encoding the baseband image data from said partial decoding means into a second code stream having a second format converted from a first format of said first code stream, the second format and the first format corresponding to different codec formats, wherein said encoding means encodes said baseband image data using a target value for parameters with respect to said second code stream, into the second code stream having the second format, said partial decoding means determines the portion to be decoded of the first code stream, using said target value, and decodes the determined portion of the first code stream, said first code stream is generated by wavelet-transforming the baseband image data and entropy-coding wavelet transform coefficients, and said partial decoding means includes entropy decoding means for entropy-decoding said first code stream, extracting means for extracting, from said wavelet transform coefficients which are generated when said first code stream is entropy-decoded by said entropy decoding means, wavelet transform coefficients required to generate said baseband image data to be coded by said encoding means to generate said second code stream having the second format thereof, depending on said target value, and baseband data generating means for generating said baseband image data using the wavelet transform coefficients extracted by said extracting means.

2. The information processing apparatus according to claim 1, wherein said extracting means includes:

subband selecting means for selecting necessary subbands depending on a target value for the resolution of image data represented by said second code stream, from said wavelet transform coefficients which are generated when said first code stream is entropy-decoded by said entropy decoding means.

3. The information processing apparatus according to claim 2, wherein:

said encoding means encodes said baseband image data such that the resolution of image data represented by said second code stream is equal to or approximates the target value thereof; and said subband selecting means selects the subbands such that the resolution of said baseband image data generated by said baseband data generating means is equal to or approximates said target value.

4. The information processing apparatus according to claim 1, wherein said extracting means includes:
counting means for counting an amount of data of bit planes of said wavelet transform coefficients which are generated when said first code stream is entropy-decoded by said entropy decoding means; and
determining means for calculating a compression ratio of a bit plane to be selected based on the amount of data which is counted by said counting means, and determining the bit plane to be selected based on said compression ratio and a target value for the compression ratio of said second code stream.

5. The information processing apparatus according to claim 4, wherein:
said encoding means encodes said baseband image data such that the compression ratio of said second code stream is equal to or approximates said target value; and
said determining means selects said bit plane such that the compression ratio of said baseband image data generated by said baseband data generating means is equal to or approximates said target value.

6. The information processing apparatus according to claim 1, wherein said extracting means includes:
subband selecting means for selecting necessary subbands depending on a color format of said second code stream, from said wavelet transform coefficients which are generated when said first code stream is entropy-decoded by said entropy decoding means.

7. The information processing apparatus according to claim 6, wherein said baseband data generating means wavelet-inverse-transforms said wavelet transform coefficients according to a process depending on the color format of said second code stream, into said baseband image data of said color format.

8. The information processing apparatus according to claim 1, further comprising:
multiplexing means for multiplexing resolution information of image data represented by said second code stream and compression ratio information corresponding to a target compression ratio for the partial decoding means to produce the target value, and for supplying the target value to the partial decoding means.

9. The information processing apparatus according to claim 1, wherein the second format corresponds to H.264, and the first format corresponds to JPEG 2000.

10. The information processing apparatus according to claim 1, wherein:
said extracting means extracts said wavelet transform coefficients required to generate said baseband image data to be coded by said encoding means to generate said second code stream having the second format thereof, after said first code stream is entropy-decoded by said entropy decoding means,
said extracting means includes subband selecting means for selecting, after said first code stream is entropy-decoded by said entropy decoding means, necessary subbands depending on a target value for the resolution of image data represented by said second code stream, from said wavelet transform coefficients which are generated when said first code stream is entropy-decoded by said entropy decoding means,
said encoding means encodes said baseband image data such that the resolution of image data represented by said second code stream is equal to or approximates the target value thereof, and
said subband selecting means selects the subbands such that the resolution of said baseband image data generated by said baseband data generating means is equal to or approximates said target value.

11. An information processing method to be carried out by an information processing apparatus for converting a first format of a first code stream representative of coded image data to generate a second code stream having a second format, said information processing apparatus including partial decoding means and encoding means,
said information processing method comprising the steps of:
decoding, with said partial decoding means, a portion of said first code stream;
encoding, with said encoding means, baseband image data generated when the portion of said first code stream is decoded by said decoding, into said second code stream having the second format, said encoding encodes said baseband image data using a target value for parameters with respect to said second code stream, into the second code stream having the second format, the second format and the first format corresponding to different codec formats; and
determining, with said partial decoding means, the portion to be decoded of the first code stream using said target value, and decoding, with said partial decoding means, the determined portion of the first code stream, wherein
said first code stream is generated by wavelet-transforming the baseband image data and entropy-coding wavelet transform coefficients, and
said decoding, with said partial decoding means, further includes
entropy-decoding, with entropy decoding means, said first code stream,
extracting, with extracting means, from said wavelet transform coefficients which are generated when said first code stream is entropy-decoded by said entropy-decoding, wavelet transform coefficients required to generate said baseband image data to be coded by said encoding to generate said second code stream having the second format thereof, depending on said target value, and
generating, with baseband data generating means, said baseband image data using the wavelet transform coefficients extracted by said extracting.

12. An information processing apparatus comprising:
a partial decoder configured to decode a portion of a first code stream representative of coded image data into baseband image data; and
an encoder configured to encode the baseband image data from said partial decoder into a second code stream having a second format converted from a first format of said first code stream, the second format and the first format corresponding to different codec formats, wherein
said encoder encodes said baseband image data using a target value for parameters with respect to said second code stream, into the second code stream having the second format,
said partial decoder determines the portion to be decoded of the first code stream, using said target value, and decodes the determined portion of the first code stream,
said first code stream is generated by wavelet-transforming the baseband image data and entropy-coding wavelet transform coefficients,
said partial decoder includes an entropy decoder configured to entropy-decode said first code stream, an extractor configured to extract, from said wavelet transform coefficients which are generated when said first code stream is entropy-decoded by said entropy decoder, wavelet transform coefficients required to generate said baseband image data to be coded by said encoder to generate said second code stream having the second format thereof, depending on said target value, and a baseband data generator configured to generate said baseband image data using the wavelet transform coefficients extracted by said extractor, and at least one of the partial decoder and encoder is implemented as hardware or as a hardware and software combination.

13. The information processing apparatus according to claim 12, wherein said extractor includes:

a subband selector configured to select necessary subbands depending on a target value for the resolution of image data represented by said second code stream, from said wavelet transform coefficients which are generated when said first code stream is entropy-decoded by said entropy decoder.

14. The information processing apparatus according to claim 13, wherein:

said encoder encodes said baseband image data such that the resolution of image data represented by said second code stream is equal to or approximates the target value thereof; and said subband selector selects the subbands such that the resolution of said baseband image data generated by said baseband data generator is equal to or approximates said target value.

15. The information processing apparatus according to claim 12, wherein said extractor includes:

a counter configured to count an amount of data of bit planes of said wavelet transform coefficients which are generated when said first code stream is entropy-decoded by said entropy decoder; and a determining unit, implemented by a processing circuit, configured to calculate a compression ratio of a bit plane to be selected based on the amount of data which is counted by said counter, and to determine the bit plane to be selected based on said compression ratio and a target value for the compression ratio of said second code stream.

16. The information processing apparatus according to claim 15, wherein:

said encoder encodes said baseband image data such that the compression ratio of said second code stream is equal to or approximates said target value; and said determining unit selects said bit plane such that the compression ratio of said baseband image data generated by said baseband data generator is equal to or approximates said target value.

17. The information processing apparatus according to claim 12, wherein said extractor includes:

a subband selector configured to select necessary subbands depending on a color format of said second code stream, from said wavelet transform coefficients which are generated when said first code stream is entropy-decoded by said entropy decoder.

18. The information processing apparatus according to claim 17, wherein said baseband data generator wavelet-inverse-transforms said wavelet transform coefficients according to a process depending on the color format of said second code stream, into said baseband image data of said color format.

* * * * *